United States Patent [19]

Brolin et al.

[11] 4,270,030

[45] May 26, 1981

[54] TESTING OF SUBSCRIBER LOOP PAIR GAIN SYSTEMS

[75] Inventors: Stephen J. Brolin, Livingston; Jeffrey L. Gottesman, Morristown; Dennis H. Morgen, Roseland; Kenneth H. Swanson, Mendham, all of N.J.

[73] Assignee: Bell Telephone Laboratories, Incorporated, Murray Hill, N.J.

[21] Appl. No.: 97,699

[22] Filed: Nov. 27, 1979

[51] Int. Cl.³ .......................... H04B 3/46; H04J 3/14
[52] U.S. Cl. ........................................ 179/175.2 D
[58] Field of Search .............. 179/175.3 R, 175.31 R, 179/2 A, 175.2 R, 175.2 D, 175.2 C; 324/158 R; 370/71, 13, 15, 14, 17

[56] References Cited

U.S. PATENT DOCUMENTS

| | | | |
|---|---|---|---|
| 3,410,966 | 11/1968 | Davies | 179/175.2 R |
| 4,002,847 | 1/1977 | Dail | 179/175.31 R |
| 4,076,971 | 2/1978 | Mukaemachi et al. | 179/175.3 R |
| 4,101,743 | 7/1978 | Costes et al. | 179/175 |
| 4,149,038 | 4/1979 | Pitroda et al. | 179/175.2 R |
| 4,170,722 | 10/1979 | Blackburn | 179/175.3 R |
| 4,196,321 | 4/1980 | Bosik | 179/175.2 R |

OTHER PUBLICATIONS

"Remote Testing for Subscriber Line System", Ruth, pp. 75 and 76 of *Telecommunications* for Jul. 1979.

*Primary Examiner*—Thomas A. Robinson
*Attorney, Agent, or Firm*—Robert O. Nimtz

[57] ABSTRACT

A testing system is disclosed for telephone subscriber loops which are in part derived by multiplex facilities in what have come to be known as pair gain systems. In this testing arrangement, the local drop wires from the remote terminal of the pair gain system to the subscriber are separated from the carrier system itself and tested by connecting them to a separate metallic pair extending from the central office to the remote terminal location. Simultaneously, the carrier-derived portion of the subscriber loop is connected to automatic testing apparatus which sequences through a plurality of automatic tests for not only transmission characteristics of the carrier-derived channel but also tests for the ability of the derived channel to transmit supervisory information such as ringing, coin control and party identification information. The remote terminal of the pair gain channel is selectively terminated by a reflective or absorptive termination to assist in these testing procedures. The testing system is designed so as to make carrier-derived channels appear to the central office testing personnel as if they were identical to metallic loops, thus saving considerable administrative burden in testing subscriber loops.

21 Claims, 20 Drawing Figures

PAIR GAIN TEST SYSTEM

PAIR GAIN TEST SYSTEM

TESTER UNIT

MICRO PROCESSOR

C.O. CHANNEL TEST UNIT

REMOTE CHANNEL UNIT

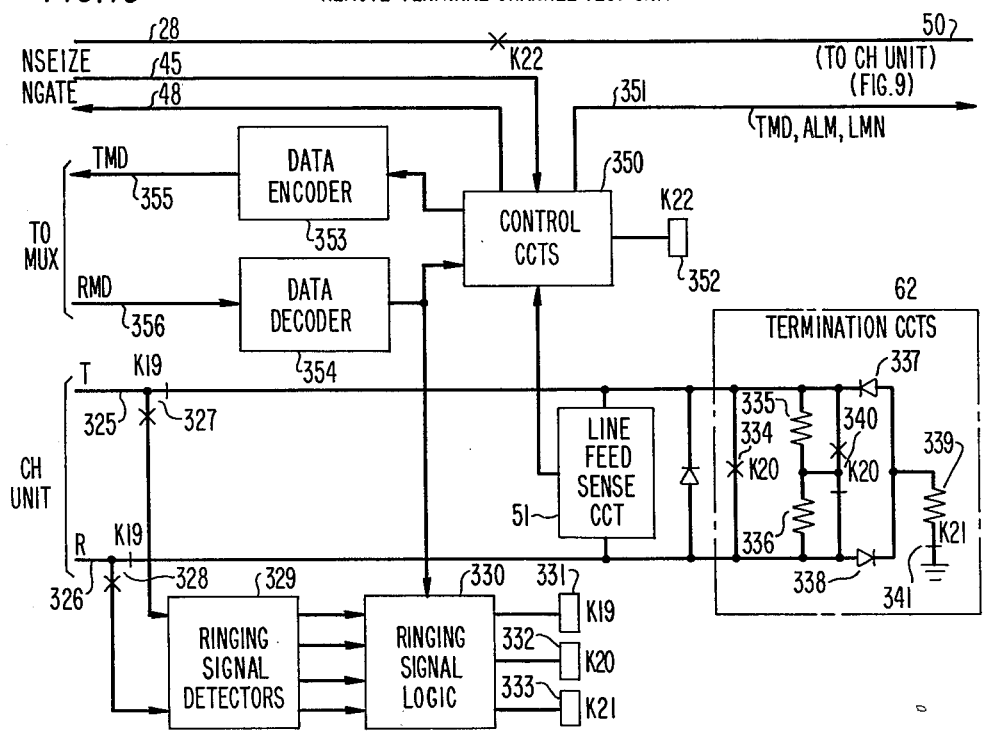
FIG. 10  REMOTE TERMINAL CHANNEL TEST UNIT
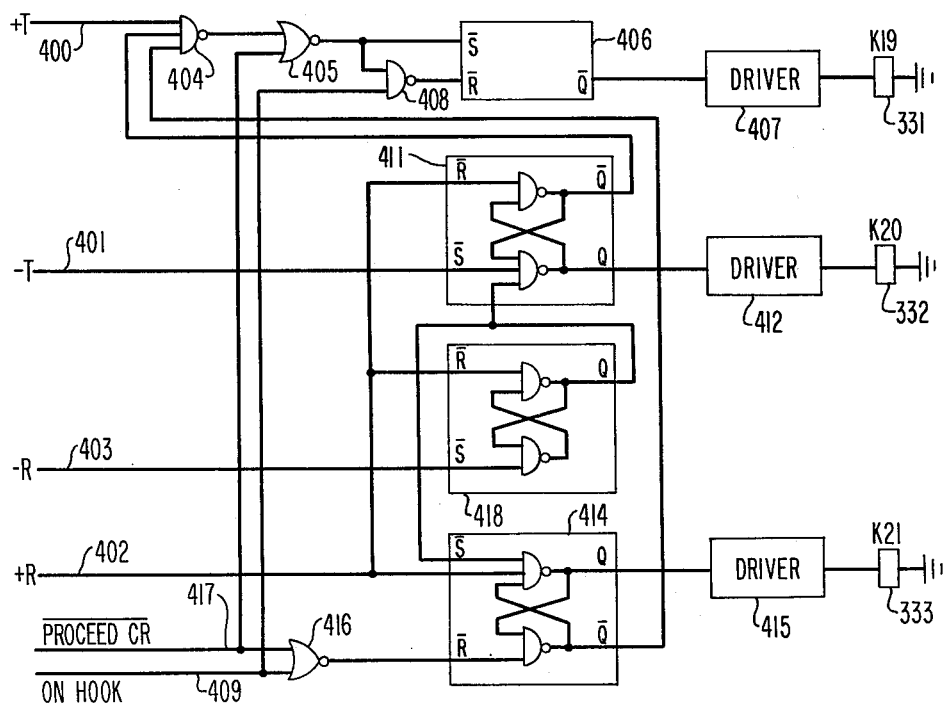
FIG. 11  RINGING SIGNAL LOGIC

LINE FEED SENSE CCT

RT CONTROL CIRCUITS

DATA TRANSMITTER

DATA RECEIVER

DATA TRANSMITTER

|    | TO C.O.     | TO R.T.     |
|----|-------------|-------------|
| D0 | SEIZE RC    | ON HOOK     |
| D1 | PROCEED RC  | PROCEED CR  |
| D2 | TEST ALM RC | TEST ALM CR |

RT TERMINATIONS STATE DIAGRAM

DLC = DATA LINK COMMAND

TEST SEQUENCE

COIN TEST SEQUENCE

MULTIPARTY TEST SEQUENCE

TESTING OF SUBSCRIBER LOOP PAIR GAIN SYSTEMS

BACKGROUND OF THE INVENTION

1. Field of the Invention

This invention relates to telephone subscriber loop testing systems and, more particularly, to universal testing arrangements for subscriber loop carrier systems.

2. Description of the Prior Art

It is known to provide a plurality of subscriber channels over a lesser plurality of metallic pairs by using conventional analog or digital carrier techniques. A typical analog carrier system is shown in the copending application of B. S. Bosik, Serial No. 974,384, filed Dec. 29, 1978, now U.S. Pat. No. 4,196,321, issued Apr. 1, 1980. A digital subscriber loop carrier system is shown in J. L. Caldwell U.S. Pat. No. 3,963,869, granted June 15, 1976.

Numerous techniques for testing the carrier portions of these carrier systems are also known, such as that disclosed in the aforementioned application of B. S. Bosik and as shown in J. E. Dail U.S. Pat. No. 4,002,847, granted Jan. 11, 1977. Such systems, however, involve not only carrier-derived channels but also voice frequency drop wires from a remote carrier terminal to the subscriber served thereby. It is desirable to test both the carrier-derived channel for a particular subscriber and the voice frequency drop for that subscriber, using a minimum amount of circuitry at the remote location. It is further desirable to accommodate these testing functions under manual or automatic control from testing facilites designed for use in testing metallic loops. With such an arrangement, special testing procedures are not required for such carrier-derived subscriber loops (as distinguished from subscribers served by metallic loops).

SUMMARY OF THE INVENTION

In accordance with the illustrative embodiment of the present invention, both the carrier-derived subscriber channel and the voice frequency portion of the subscriber channel from the remote carrier terminal to the subscriber premises are tested from standard testing facilities. In order to accomplish metallic testing of the voice frequency drops for a plurality of carrier-served subscribers, a single metallic test pair is provided between the central office and the remote terminals of the pair gain system. In addition, a test controller is connected in tandem between the standard testing facilities and the central office switch which responds to standard test initiation signals by connecting the metallic pair to the test facilities at one end and to the subscriber voice frequency drop at the other end. At the same time, the carrier-derived subscriber channel is reflectively or absorptively terminated to permit automatic testing from the test controller through the central office switch. It is therefore possible for testing personnel to conduct standard metallic tests on the subscriber voice frequency drop while the carrier-derived portion of the subscriber loop is automatically tested from the test controller.

Testing arrangements in accordance with the present invention provide complete testing of each carrier-derived subscriber loop, both the carrier portion and the metallic portion. Moreover, such tests are responsive to standard test signals, either manual or automatic. Finally, the testing of the carrier-derived portion is controlled independently of the type of carrier system while the actual tests performed are tailored to the particular type of service provided by the carrier system channel.

BRIEF DESCRIPTION OF THE DRAWINGS

In the drawings:

FIG. 10 is a detailed block diagram of a remote terminal channel test unit useful in the pair gain testing system of FIG. 1;

FIG. 11 is a detailed circuit diagram of the ringing signal logic circuitry used in the remote terminal channel test unit of FIG. 10;

DETAILED DESCRIPTION

Figure 1:
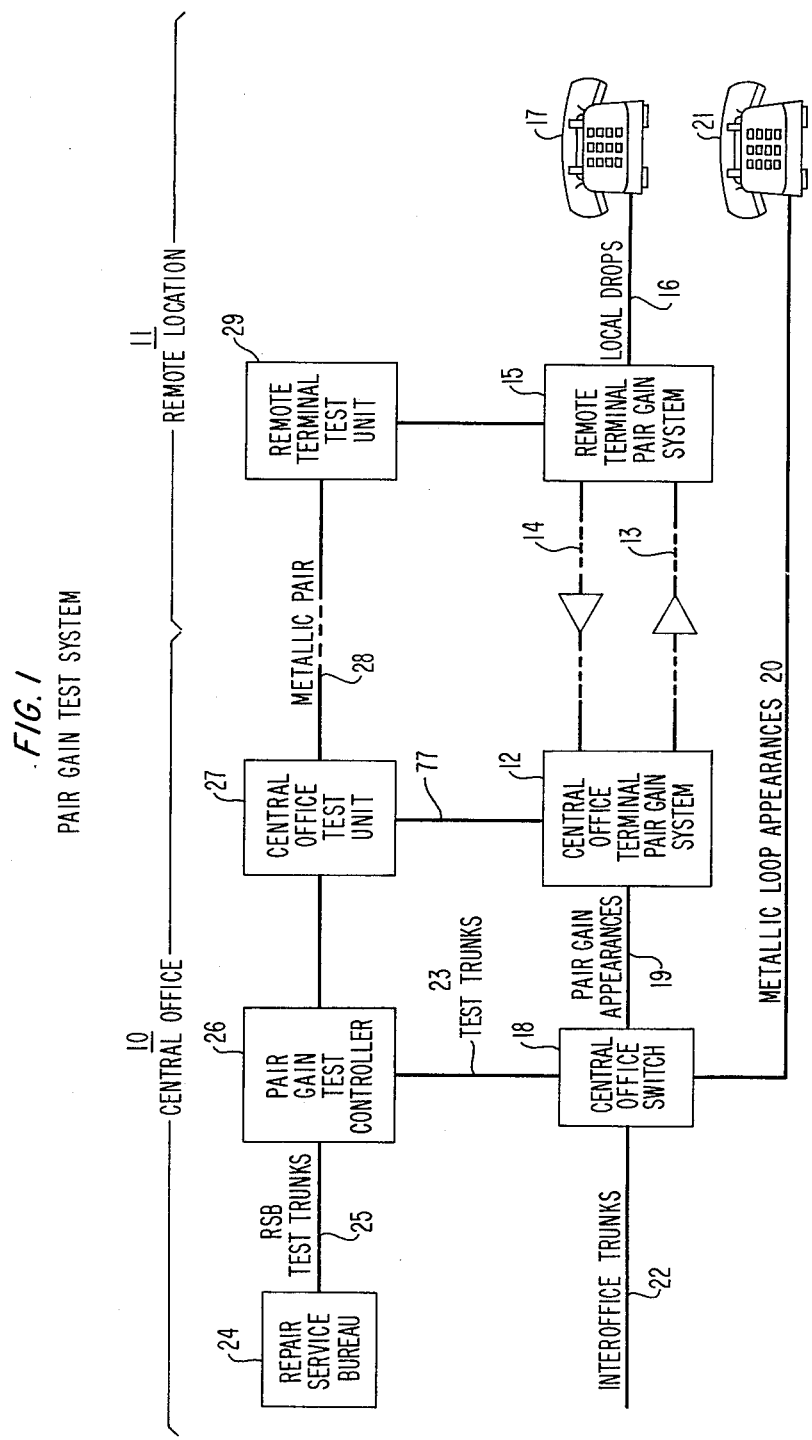
FIG. 1 is a general block diagram of a pair gain testing system in accordance with the present invention.

Referring more particularly to FIG. 1, there is shown a general block diagram of a pair gain test system in accordance with the present invention. The system of FIG. 1 comprises a central office location 10 and a remote location 11. The central office location 10 contains the central office terminal 12 of a pair gain system. Terminal 12 provides derived subscriber channels over outgoing repeatered transmission facility 13 and incoming repeatered transmission facility 14 by using well-known analog or digital multiplexing techniques. Thus, terminal 12 may provide a plurality of frequency-separated channels on facilities 13 and 14, or a plurality of time multiplexed digital channels on facilities 13 and 14. A corresponding remote terminal 15 of the pair gain system separates the signals on these multiplexed channels into a plurality of voice frequency analog signals on local drop wires 16 for delivery to a plurality of subscriber stations 17.

The central office location 10 includes a central office switch 18 comprising any standard central office switching system such as an electronic, crossbar or step-by-step switching system. Central office switch 18 serves to interconnect the voice frequency pair gain appearances on leads 19 and a plurality of metallic loop appearances 20 (connected via metallic loops 20 to subscriber stations 21) to other loops, outgoing interoffice trunks 22 or to test trunks 23.

The central office location 10 also includes trunks 25 connected to a standard repair service bureau (RSB) 24 which is normally used to gain access via test trunks 23 and central office switch 18 to metallic loops 20 for testing purposes. The RSB 24 normally includes either manual local test desks for manually testing loops 20 or automatic testing equipment for automatically testing loops 20. The principle function of the RSB 24 is the testing of loops 20 when a trouble report is received from a customer.

In accordance with the present invention, the test trunks 25 from RSB 24 are connected through a pair gain test controller 26 to the test trunks 23. In general, the pair gain test controller 26 permits RSB 24 to gain test access to the local loops connected to pair gain appearances 19 via the pair gain system 12–15. Access to the local drops 16 is provided through a central office test unit 27, a metallic pair 28 and a remote terminal test unit 29. A single metallic pair 28 is adequate to provide access to a large number of local drops 16 served by the same pair gain system 12–15 (or shared by collocated systems).

In addition to providing metallic access to the local drops 16 via metallic pair 28, pair gain test controller 26 also obtains direct access through the central office switch 18 to the central office terminal of the carrier-derived channels of pair gain system 12–15. Remote terminal test unit 29 provides preselected test terminations at the remote terminal ends of the carrier-derived channels so as to permit loop-around testing of each of the carrier-derived channels from the pair gain test controller 26. The channel tests conducted by pair gain controller 26 can be made entirely automatic and can take place simultaneously with the testing of the local drops 16 from the RSB 24.

It can be seen that the system of FIG. 1 provides general access to all portions of a pair gain system for testing purposes. Separate access to the local loops and customer terminal equipment is provided through the metallic pair 28. Simultaneously, test access is provided to the channels of the pair gain system through test trunks 23 and central office switch 18. Since the testing procedures involve providing normal signal conditions at the central office pair gain channel appearances, the channel testing portion of the system is entirely independent of the type of pair gain systems involved. Thus, the same testing arrangements can be used for both analog and digital pair gain systems, independently of the number of channels provided by that system. The test connections can be set up from the RSB 24 to the channel appearances at the central office simply by dialing the telephone number of the line to be tested. RSB 24 can then conduct standard tests of the connection to the central office appearance of the pair gain channel. After initiating test access to the subscriber channel itself, RSB 24 may then proceed with standard testing sequences and need not be concerned about special testing procedures for carrier-derived subscriber loops. This capability relieves an enormous administrative burden in RSBs for central offices having mixed metallic and carrier-derived subscriber loops.

Figure 2:
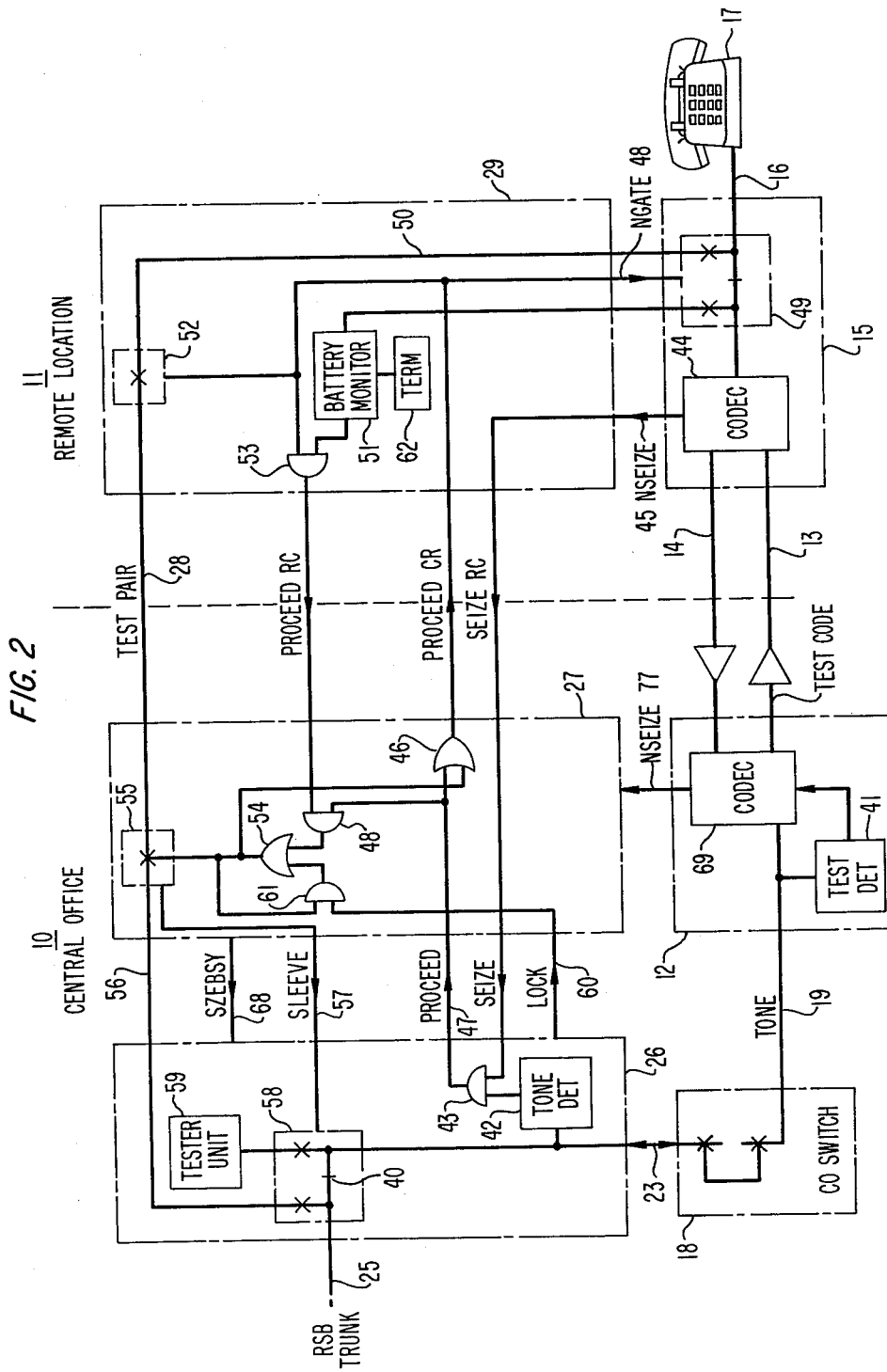
FIG. 2 is a more detailed schematic block diagram of the test connections for a single subscriber loop using the testing arrangements of FIG. 1.

In order to better understand the automatic procedures for setting up a test connection to a carrier-derived subscriber loop, the simplified schematic diagram of FIG. 2 can be considered. The equipment blocks of FIG. 2 corresponding to the equipment units of FIG. 1 have been identified by the same reference numerals for convenience. It has been assumed that the pair gain system is a multiplexed digital system having digital signaling channels as well as digital voice channels. These digital signaling channels are used to exchange control information between the central office location 10 and the remote location 11 of the pair gain test system. In a frequency-separated analog pair gain system, such a signaling channel might be provided by a separate frequency band.

In the schematic diagram of FIG. 2, an RSB (not shown) has access via RSB trunks 25 to test trunks 23 through normally closed contacts 40 in the pair gain test controller 26. Thus, the RSB trunks 25 can be used to gain direct access to the metallic loops 20 (not shown in FIG. 2).

When the telephone number of a subscriber connected to a pair gain system is dialed through RSB trunk 25 and central office switch 18, a connection is established via line 19 to the codec 69 in the central office terminal 12 of the pair gain system. To initiate the testing procedure, testing personnel at the RSB apply a test voltage (+116 volts) to the tip side of the test trunk. This can be accomplished at the test desk by operating the reverse (REV) and the positive station (+STA) keys. The +116-volt potential is supplied through normally closed contacts 40 to a test voltage detector 41 in terminal 12. In response to the detection of the test voltage, codec 69 places a tone on line 19 which is transmitted through switch 18 and trunk 23 to a tone detector 42 in pair gain test controller 26. At the same time, an NSEIZE signal is produced on lead 77 which is used to determine whether the testing configuration is already in use, in which case a seize busy signal (SZEBSY) on lead 68 notifies testing personnel of this condition. Simultaneously, codec 69 transmits a test code in the signaling bit stream on outgoing line 13. A scheme for providing a per channel signaling capability in standard D-type digital channel banks is disclosed in the copending application of S. J. Brolin, Ser. No. 057,333, filed July 13, 1979. The signal originated in codec 69 initiates a handshaking routine which insures that the proper test trunk is associated with the proper pair gain system and the proper subscriber channel in that system.

When the tone is detected by tone detector 42, an output is provided to AND gate 43 to partially enable AND gate 43. This signal indicates a request for a test connection and identifies the particular test trunk that is to be connected, tone detector 42 being duplicated for each of the test trunks.

Receipt of the test code on outgoing line 13 by the codec 44 in the remote terminal 15 of the pair gain system causes a signal (NSEIZE) to be transmitted on lead 45. The remote terminal test unit 29 utilizes a data link channel on incoming line 14 to transmit a signal (SEIZE RC) to the central office test unit 27. One technique for deriving an additional data link in standard D-type digital channel banks is disclosed in the copending application of J. E. Landry, Ser. No. 966,637, filed Dec. 5, 1978. Central offic test unit 27, in response to the SEIZE RC signal, causes a signal (SEIZE) to be transmitted to the pair gain test controller 26 to complete the enablement of AND gate 43. In response to the output of AND gate 43, the pair gain test controller 26 can select a particular tester unit 59 and associated tester trunk for assignment to this test activity. Thus, pair gain test controller 26 includes a plurality of tester units which can be scanned to locate the first available and nonbusy tester unit. The pair gain test controller 26 may, at this point in time, perform a test sequence on the tester unit itself to assure its general functioning and calibration. Failure of such a test would flag that tester unit as busy and a next available tester unit selected, simultaneously operating an office alarm.

When a suitable tester unit 59 has been selected, the output of AND gate 43 generates a PROCEED signal on lead 47 to central office test unit 27. The PROCEED signal appears on a different lead, depending on the particular tester unit selected. In central office test unit 27, this PROCEED signal is transmitted through OR gate 46 to produce a signal (PROCEED CR) transmitted to the remote terminal test unit 29 via the signaling channel on outgoing line 13. Simultaneously, the PROCEED signal on lead 47 partially enables AND gate 48.

At the remote terminal test unit 29, the PROCEED CR signal provides an NGATE signal on lead 48 to the remote terminal 15 of the pair gain system. This NGATE signal on lead 48 operates a channel test relay for the channel under test which, in turn, operates the cut-apart contacts 49 in terminal 15. Contacts 49 disconnect the local drop 16 from the pair gain channel provided by codec 44 and connect local drop 16 to line 50 to the remote terminal test unit 29. Contacts 49 also connect the subscriber channel appearance at codec 44 to a battery monitor circuit 51 and test termination circuit 62 in remote terminal test unit 29.

The PROCEED CR signal also operates a relay to close normally open contacts 52 to connect line 50 to the test pair 28. The battery monitor 51 senses the talking battery on the subscriber apearance of codec 44 to provide a signal to one input of AND gate 53, indicating the proper operation of contacts 49 and the channel test relay. AND gate 53 is completely enabled by the PROCEED CR signal and, when enabled, generates a PROCEED RC signal which is transmitted via the data link channel on incoming line 14 back to central office test unit 27. Receipt of the PROCEED RC signal at the central office test unit 27 completes the enablement of AND gate 48 which operates through OR gate 54 to close normally open contacts 55, connecting the test pair 28 via line 56 to the pair gain test controller 26.

The output of OR gate 54 also produces a SLEEVE signal on lead 57 which operates the cut-apart contacts 40 in pair gain test controller 26. Thus, RSB test trunk 25 is disconnected from the test trunk 23. When the test voltage (+116 volts) is removed from the test trunk 25, the tester unit 59 is connected via trunk 23, central office switch 18 and line 19 to the subscriber appearance on codec 69 of the central office terminal 12 of the pair gain system. The RSB trunk 25 is connected via contacts 58 and line 56 through contacts 55 to the test pair 28. When these connections have been completed, the pair gain test controller 26 generates a LOCK signal on lead 60 to central office test unit 27. The signal on lead 60 enables AND gate 61 which was partially enabled by the output of OR gate 54. The PROCEED signal on lead 47 may be removed at this time. The output of AND gate 61 is applied through OR gate 54 to hold contacts 55 and contacts 58 closed during the entire testing operation. Removal of the LOCK signal on lead 60 causes these relay contacts to release and also terminates the PROCEED CR signal to release the remote connections.

The system of FIG. 2 is now in a condition to proceed with testing sequences. The manual or automatic test desk connected to RSB trunk 25 is now connected through the test pair 28 to the local drop 16. This affords a direct metallic connection which permits testing personnel or automatic apparatus to subject local drop 16 and subscriber station 17 to any of the normal testing procedures used for metallic loops. These tests include, for example, leakage tests between conductors or between either conductor and ground, tests for foreign voltages on the line, ballistic tests for ringers on the line, and so forth. Personnel at the RSB may even monitor the local drop 16 by connecting a telephone set to the line at the RSB.

Simultaneously wih such metallic access testing, the tester unit 59 is connected to the subscriber channel appearance on codec 69 and the termination circuits 62 are connected to the subscriber side of the channel unit under test. Terminations 62 provide test terminations for the subscriber channel and thus permit the tester 59 to conduct tests of the subscriber channel under automatic control. These tests can include such alternating current transmission tests as round-trip channel loss, echo return loss and idle channel noise measurement. These terminations also permit the detection of off-hook, tip party identification ground, coin collect and return signals as well as various forms of single-part and multiparty ringing signals.

It will be noted that the bulk of the testing circuitry is located in the tester unit 59 at the central office pair gain test controller 26. The only circuits located at the remote location 11 are the terminations 62, which may comprise simple reflective and absorptive terminations and ground connections. Changes in these terminations may be effected by using multiparty ringing or coin collect or return signals as control codes for controlling these terminations. Since the subscriber channel is not connected to the subscriber drop 16, these station control codes can now be used as signaling codes to control the terminations in terminating circuit 62.

It can be seen that the above-described arrangements permit separate and simultaneous testing of both the metallic subscriber drop 16 and the corresponding one of the derived subscriber channels in lines 13 and 14. The metallic drop testing sequences can be carried out manually or automatically, using the same circuitry used for normal metallic loops extending from the central office. This permits standard testing procedures to be used in the RSB for all subscribers serviced from that central office, whether by metallic loops or by carrier-derived subscriber channels. This provides an enormous reduction in the administrative burden of operating the central office.

At the same time, the tester unit 59 can conduct automatic test sequences on the selectively terminated carrier-derived subscriber channel in the pair gain system. Thus, the total link to the subscriber from the central office is simultaneously tested to insure complete availability and operability of the subscriber connection. Results of the tests conducted by the tester unit 59 can be relayed to the RSB by applying test response tones and voltages to the RSB trunk 25 to provide an audio or visual signal to the testing personnel, indicating the successful completion of the automatic channel tests.

Execution of the entire interconnection sequence can be accomplished in approximately one second. All steps of the interconnection procedure are automatically timed and, should a time-out occur or an improper signal be received, a reorder signal (fast busy) is returned to the RSB. A new attempt can then be initiated to set up the test connection. Final cut-through of the test trunk contacts 58 is delayed until the +116-volt test signal is removed from the tip conductor of the RSB test trunk 25. This gives testing personnel a positive confirmation that the test connections have been set up properly.

The overall operation of the pair gain test system of FIG. 1 has been described in general outline form in connection with FIG. 2. The balance of the drawings describe the detailed circuitry necessary to implement the operation described above.

Figure 3:
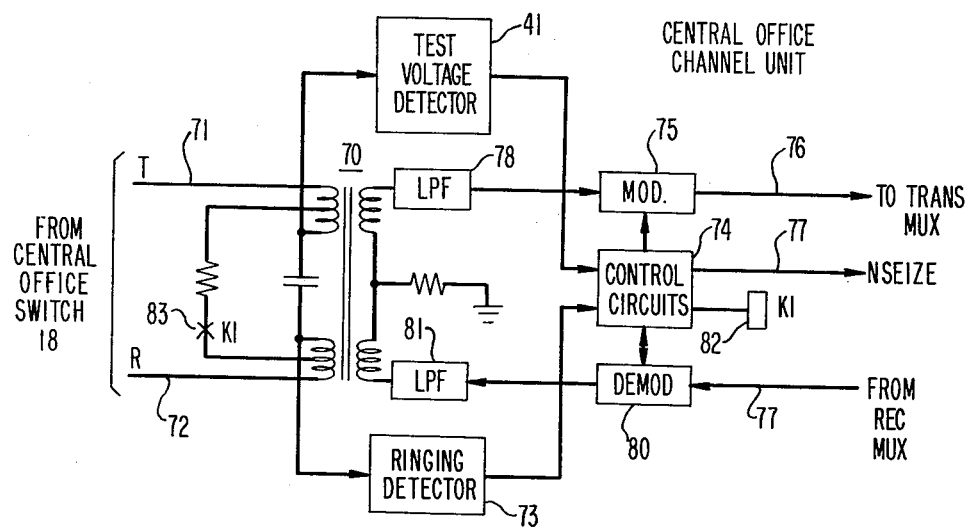
FIG. 3 is a more detailed block diagram of a central office channel unit useful in the pair gain testing system of FIG. 1.

In FIG. 3 there is shown a detailed block diagram of one of the central office channel units in codec 69 of the central office terminal 12 of the pair gain system. The central office channel unit comprises a hybrid transformer 70 to which the tip conductor 71 and the ring conductor 72 of the central office appearance of the particular subscriber are connected. A ringing detector 73 is connected via one winding of hybrid transformer 70 to the ring conductor 72 and serves to detect ringing signals applied to conductors 71 and 72 by the central office. Detection of ringing signals causes an input to be supplied to control circuits 74 which encode these ringing signals via modulator 75 and transmits them via line 76 to the outgoing transmission facility 13 (FIG. 1).

The tip conductor 71 is connected through another winding of hybrid 70 to the test voltage detector 41, the output of which is also connected to control circuits 74. As discussed in connection with FIG. 2, test voltage detector 41 is designed to detect the +116-volt test signal on tip lead 71. The appearance of such a test voltage causes control circuits 74 to emit the NSEIZE signal on lead 77 to be used, as previously described, to control the central office test unit 27 as shown in FIG. 2. At the same time, a tone is placed on the conductors 71 and 72 for detection by detector 42 (FIG. 2).

Voice signals appearing on conductors 71 and 72 are transmitted through hybrid 70 and low-pass filter 78 to modulator 75. These voice signals are encoded in modulator 75 and transmitted on line 76 to the outgoing transmission facility 13. Incoming signals from transmission facility 14 are demultiplexed and supplied by way of lead 79 to demodulator 80 which demodulates the voice frequency signal and supplies it through low-pass filter 81 and hybrid transformer 70 to conductors 71 and 72.

A coded off-hook signal appearing on lead 79 is demodulated by demodulator 80 and supplied to control circuits 74 to operate relay 82. Relay 82, in turn, closes normally open contacts 83 to relay the off-hook condition to the central office by closing a path between conductors 71 and 72.

Figure 4:
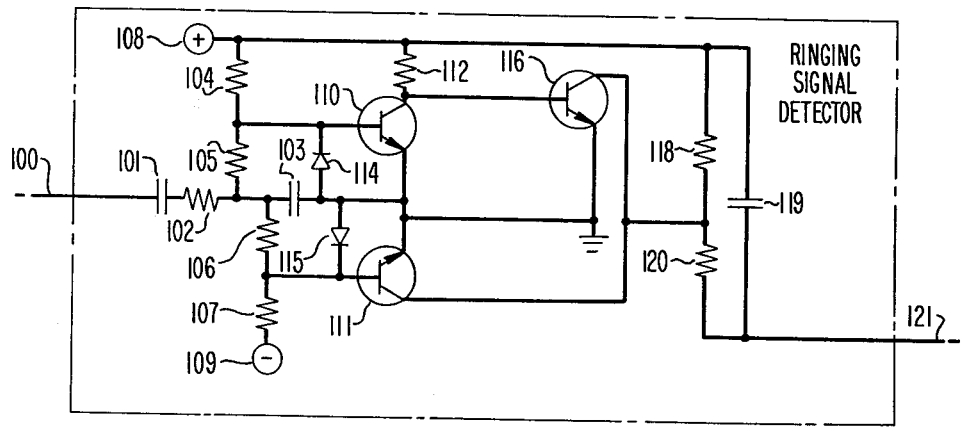
FIG. 4 is a detailed circuit diagram of a ringing signal detector suitable for use in the channel unit of FIG. 3.

In FIG. 4 there is shown a detailed circuit diagram of the ringing signal detector 73 of FIG. 3. Ringing signals applied to input lead 100 are supplied through blocking capacitor 101 to a noise filter including resistor 102 and capacitor 103. Capacitor 101 blocks direct current. The positive and negative halves of the ringing signal draw currents through resistors 105 and 106, respectively. Current biasing resistors 104 and 107 are connected from positive voltage source 108 and negative voltage source 109, respectively. The midpoint of resistors 104 and 105 is connected to the base of transistor 110 while the midpoint of resistors 106 and 107 is connected to the base of transistor 111. Capacitor 103 is connected to the midpoint of resistors 105 and 106. When the current drawn through resistor 105 rises to a sufficiently high level to exceed the bias current through resistor 104, transistor 110 turns OFF. When the current through resistor 106 exceeds the bias current through resistor 107, transistor 111 conducts. Diodes 114 and 115 protect transistors 110 and 111, respectively, from reverse base-emitter voltages.

The collector of transistor 110 is connected to the base of transistor 116 and biasing resistor 112. When transistor 110 turns OFF, transistor 116 will turn ON, grounding this common node. Therefore, large positive or negative input signals will cause either transistor 111 or transistor 116 to conduct, grounding the common node at their collectors. Grounding this common node draws a current through resistor 120 to discharge capacitor 119, connected to source 108 and thereby charged to the supply level. When the charge on capacitor 119 is sufficiently lowered, an output signal appears on lead 121. Resistors 118 and 120, connected in series across capacitor 119, control the recovery time of the output circuit.

It will be noted that the ringing signal detector of FIG. 4 responds to both single-party and multiparty superimposed ringing signals. The signal on lead 121 is applied in FIG. 3 to control circuits 74 to relay these ringing signals via modulator 75 and line 76 to the remote terminal.

Figure 5:
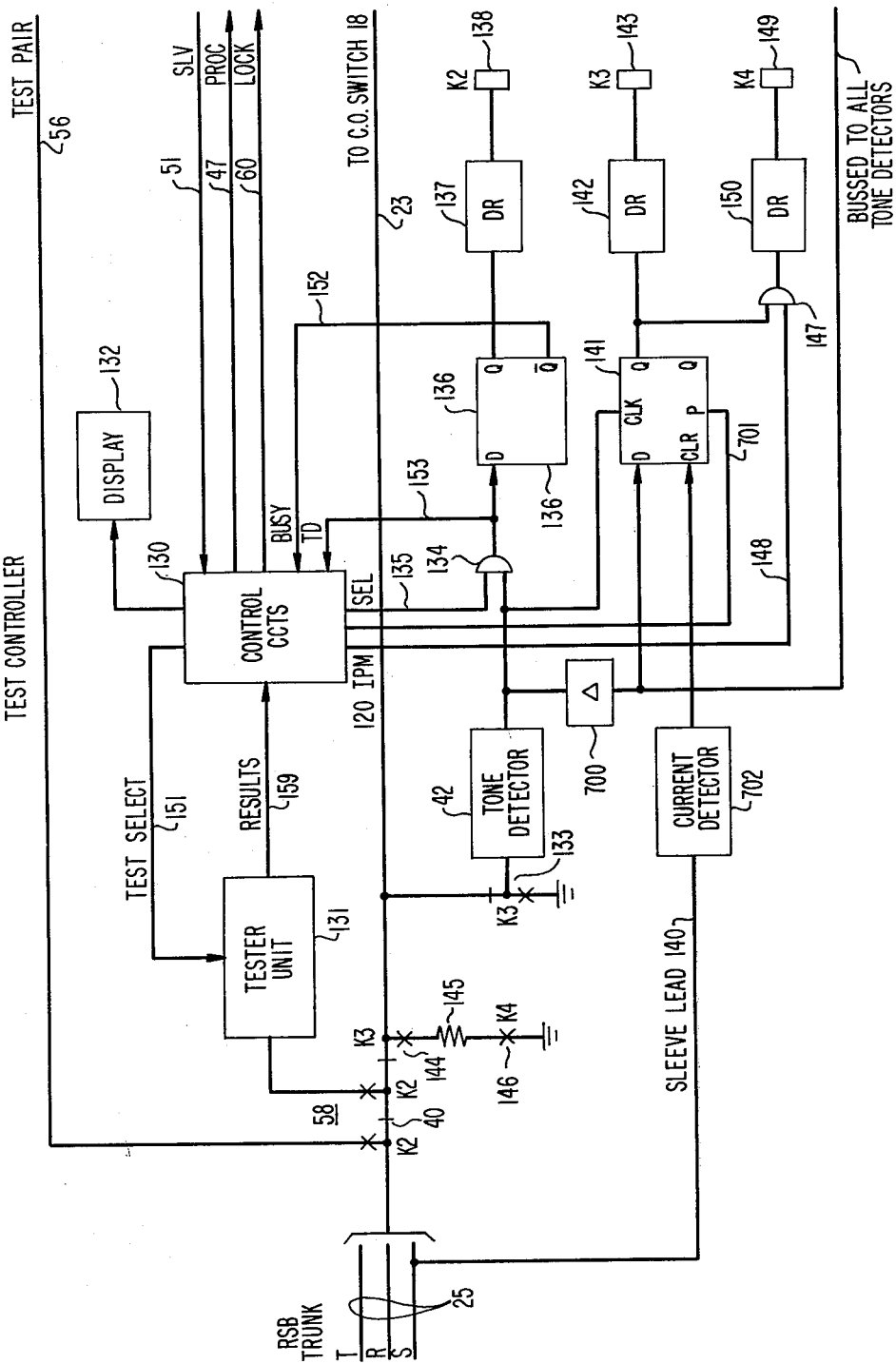
FIG. 5 is a more detailed block diagram of the central office test controller used for automatic channel testing in the system of FIG. 1.

In FIG. 5 there is shown a more detailed block diagram of the pair gain test controller 26 of FIGS. 1 and 2. The test controller of FIG. 5 comprises control circuits 130, tester unit 131, tone detector 42, a maintenance display device 132 and various logic circuits. The tip, ring and sleeve conductors 25 of an RSB trunk are supplied through K2 contacts 58 to a test pair 56 or to a test trunk 23 to the central office switch through K3 contacts 144. The normally closed contact 40 of the K2 contacts 58 is the same as those shown in FIG. 2. Trunk 23 is connected through K3 contacts 133 to tone detector 42. The appearance of a tone on line 23 from the central office switch is therefore detected in tone detector 42 to partially enable AND gate 134. AND gate 134 is fully enabled by a SELECT signal on lead 135 from control circuits 130. Since the detailed logic circuitry of FIG. 5 is repeated for each RSB test trunk 25 and each tester unit 131, the SELECT signal on lead 135 serves to identify the particular tester unit 131 selected and the tone detector output serves to select the particular test trunk to be used.

The output of AND gate 134 is supplied to control circuits 130 and, simultaneously, to the D input of flip-flop 136. The ONE output of flip-flop 136 is supplied to relay driver circuit 137 to operate K2 relay 138. Relay 138 operates K2 contacts 58 to cut apart the subscriber connection, connecting trunk 25 to test pair 56 and connecting tester unit 131 to trunk 23.

As each test trunk has its own tone detector, a possibility exists that near simultaneous tone detection could occur on multiple test trunks. To prevent the possibility of connection of a tester unit to more than one test trunk, the outputs of all tone detectors are applied to the D input of each flip-flop 141 while the output of a given tone detector is applied to the edge triggered clock input of its associated flip-flop 141. Note that a given tone detector cannot operate its associated flip-flop 141 because delay 700 prevents a change of the D input until after the clock edge. This feature restricts the possibility of ambiguous tone detection to a time window determined by delay 700, in this application less than 50 nanoseconds.

Flip-flop 141, when operated, supplies a signal to relay driver 142 to operate K3 relay 143. K3 contacts 144 connect trunk 25 through resistor 145 and K4 contacts 146 to ground. The output of flip-flop 141 also partially enables AND gate 147. AND gate 147 is fully enabled by a 120IPM (120 interruptions per minute) signal on lead 148 to enable K4 relay 149 through relay driver 150. Thus, an attempt to access a busy central office test trunk 23 causes K3 contacts 144 to connect the RSB trunk 25 to an intermittent ground to provide a fast busy signal which indicates to the RSB 24 that access should be reattempted. Additionally, lead 701 provides a means for the control circuits 130 to operate flip-flop 141 via its preset input when no tester units are available for assignment, when a SZEBSY is received or when a problem has occurred in the interconnection sequence. Sleeve lead 140, in conjunction with current detector 702, provides a means of disconnecting the fast busy indication from the test trunk.

The testing sequences carried out by tester unit 131 are under the control of control circuits 130 by way of test selection leads 151. Test results are returned to control circuits 130 by leads 159. Display unit 132 can be used to identify an appropriate trouble correction procedure. Control circuits 130 also generate the PROCEED signals on leads 47 and the LOCK signals on leads 60 and receive the SLEEVE signals on leads 51, all connected to the central office test unit 27. K3 contacts 133 lock the tone detector 42 out of the circuit when a fast busy indication is being returned on the RSB trunk 25. Flip-flop 136 also provides busy signals on ZERO output lead 152 to control circuits 130. The output of AND gate 134 on lead 153 indicates to control circuits 130 which tester unit has been assigned.

Figure 6:
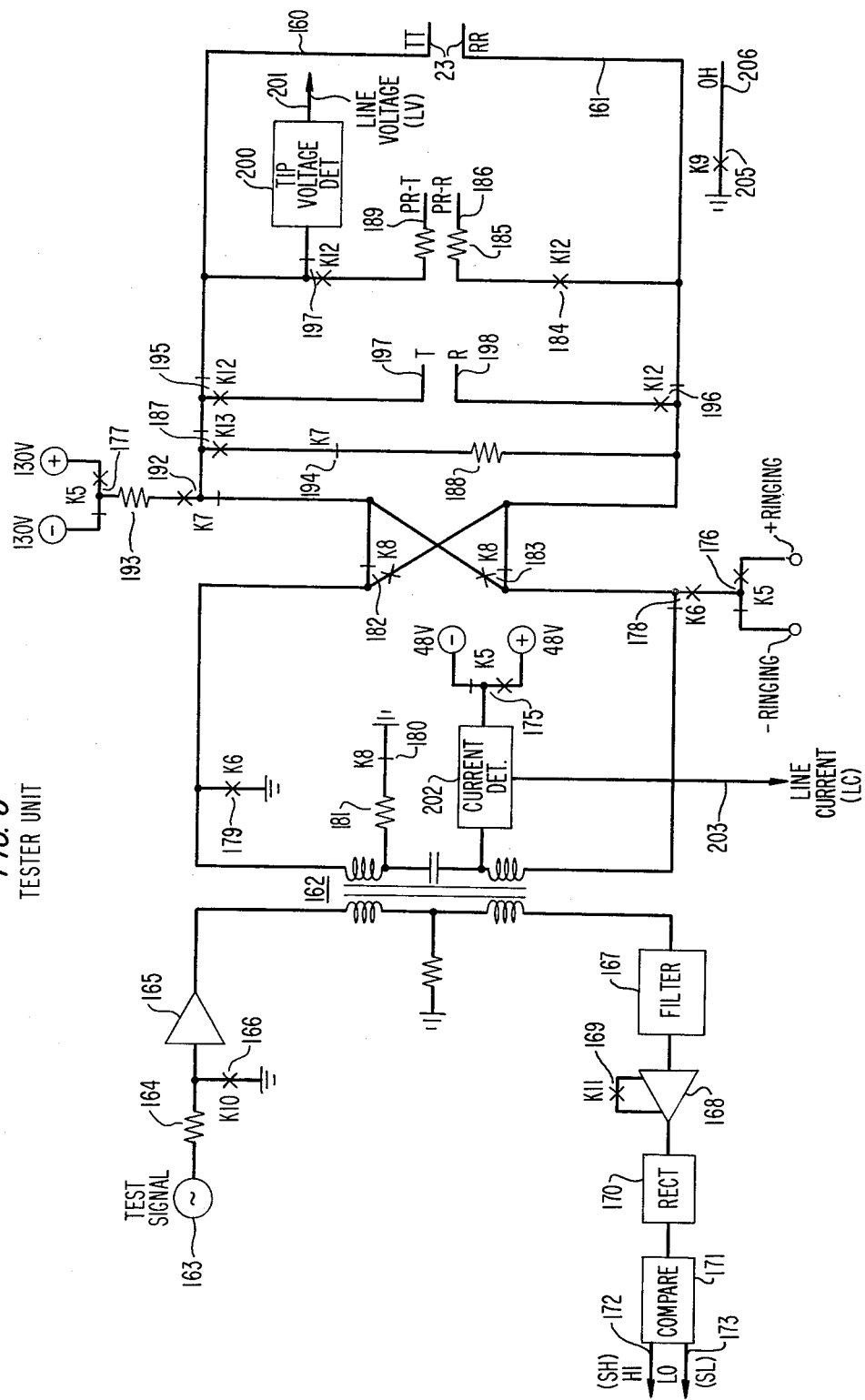
FIG. 6 is a detailed circuit diagram of the tester unit in the test controller of FIG. 5.

In FIG. 6 there is shown a detailed circuit diagram of one of the tester units such as the tester unit 131 of FIG. 5. The tester unit of FIG. 6 is under the control of nine test relays K5 through K13 (not shown in FIG. 6) operated by nine signals on leads 151 in FIG. 5 (also not shown in FIG. 6). In FIG. 6 the tip conductor 160 and ring conductor 161 are connected from the test trunk 23 through various relay contacts to a hybrid coil 162. A test signal source 163 is connected through resistor 164 and amplifier 165 to one winding of hybrid coil 162. Thus, the test signal originated in source 163 can be transmitted through hybrid 162 to the tip conductor 160 and ring conductor 161 of test trunk 23. Alternating current tests, such as return loss and noise, can be conducted using a signal from source 163. The frequency of this test signal is preferably swept through a portion of the voice frequency range to reduce the effect of interhybrid reflections. K10 contacts 166 disable these AC tests by grounding out the input to amplifier 165.

Return signals from test trunk 23 are transmitted through hybrid coil 162 to a filter 167, the output of which is connected to a variable gain amplifier 168. K11 contacts 169 vary the gain of amplifier 168 to permit an increased sensitivity when measuring noise signals. The output of amplifier 168 is applied to rectifier 170, the output of which is supplied to a compare circuit 171. Compare circuit 171 compares the output of rectifier 170 to various thresholds and provides output signals on leads 172 and 173 when these thresholds are crossed. One threshold may, for example, be used for round-trip loss and return loss while another threshold is used to measure noise.

K5 contacts 175 reverse the normal talking battery voltage on ring conductor 161 while K5 contacts 176 reverse the polarity of superimposed ringing signals. K5 contacts 177 reverse the polarity of coin voltage applied to tip conductor 160. K6 contacts 178 apply ringing signals to ring conductor 161 while simultaneously grounding tip conductor 160 through K6 contacts 179. Normally closed K8 contacts 180 provided a ground on tip conductor 160 through resistor 181 and a coil on hybrid transformer 162. K8 contacts 182 and 183 reverse the tip and ring connections, thereby supplying battery or ringing to the tip conductor 160 instead of the ring conductor 161. K13 contacts 187 insert a termination resistor 188 between tip conductor 160 and ring conductor 161 and simultaneously break the tip conductor 160 connection.

K7 contacts 192 connect coin voltages to tip conductor 160 through resistor 193 while K7 contacts 194 remove the terminating resistor 188 from across the tip and ring conductors when K13 contacts 187 are operated. K12 contacts 195 and 196 connect hybrid 162 to leads 197 and 198 to establish a path between the tester unit and the central office switch and simultaneously connect trunk 23 through K12 contacts 197 and 184 to leads 198 and 186, which constitute the metallic test pair.

A voltage detector 200 is normally connected to tip conductor 160 through K12 contacts 197 and monitors tip voltage, providing an output signal on lead 201. A current detector 202 is connected in series with the talking voltage supplied through K5 contacts 175 and provides an indication of this line current on lead 203 for both off-hook loop current and coin or ANI tip currents.

K9 contacts 205 provide an on-hook signal on lead 206 which is transmitted to the remote terminal via the data link to return the remote termination of the carrier-derived subscriber channel to the on-hook condition. This permits ringing signals to be used to control the remote termination of the channel.

It can be seen that the tester unit of FIG. 6 can selectively provide alternating current voice frequency test signals, direct current and ringing/coin signal conditions on test trunk 23, under the control of the nine test relays. Simultaneously, the tester unit provides an indication of line voltage (on lead 201) and of line current (on lead 203) as well as indications on leads 172 and 173 of the results of the alternating current tests.

The test relays controlling the tester unit of FIG. 6 are under the control of signals on leads 151 from the control circuits 130 of FIG. 5. Control circuits 130 may comprise a detailed logic circuitry to provide all of necessary control signals or may, in the preferred embodiment, comprise a microprocessor to provide the same functions.

Figure 7:
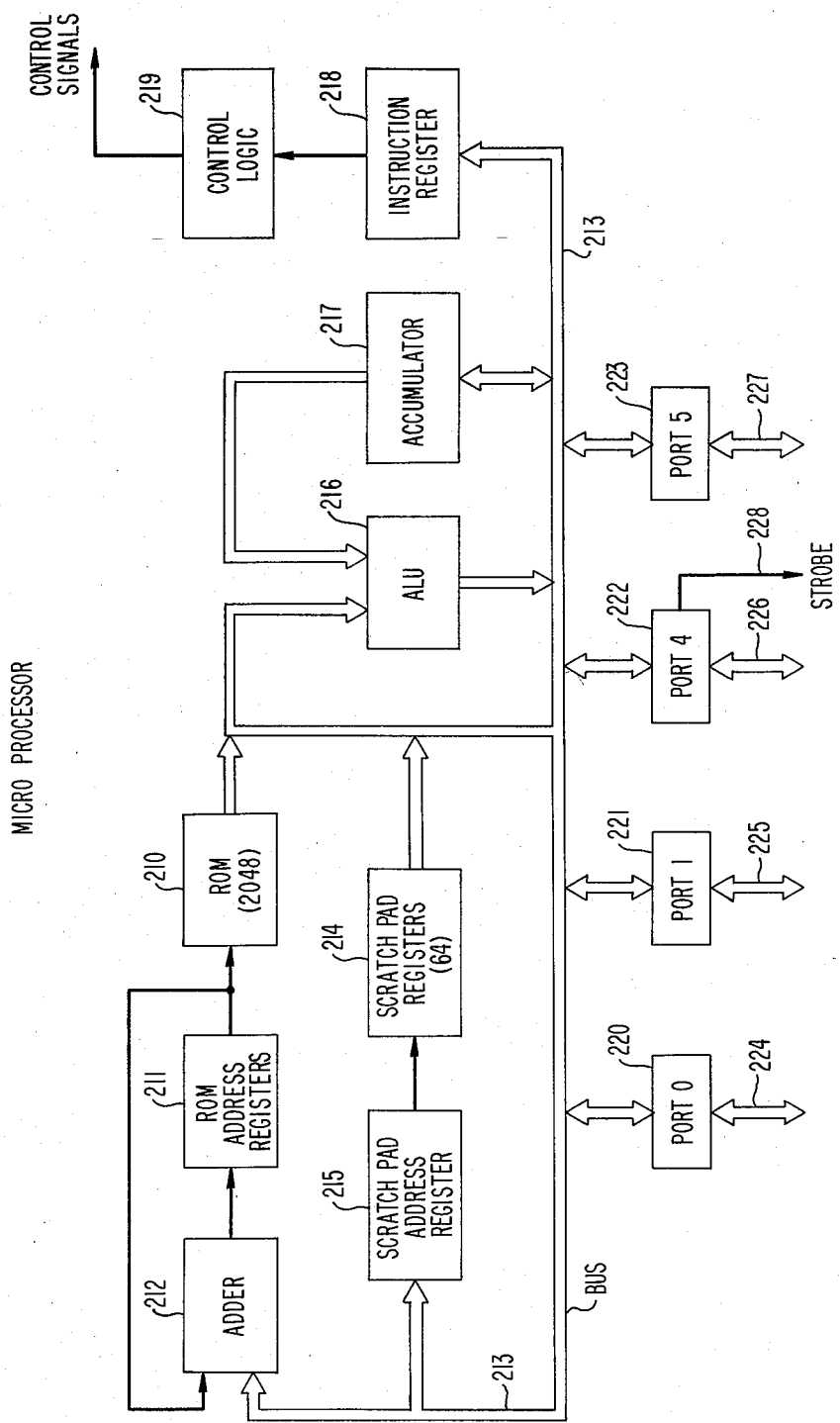
FIG. 7 is a general block diagram of a microprocessor useful as the control circuits of the test controller of FIG. 5.

In FIG. 7 there is shown a general block diagram of a microprocessor suitable for use as control circuits 130 in FIG. 5. By of way illustration, the microprocessor of FIG. 7 might comprise, for example, the MK3870 single chip microcomputer of the Mostek Corporation.

The microprocessor of FIG. 7 comprises a read-only memory 210 in which control programs are stored for controlling the balance of the unit. Memory 210 is accessed by address codes in address register 211, which address codes are derived from adder circuit 212. One input to adder circuit 212 is taken from bus 213, connected to all of the major units of the microprocessor of FIG. 7. The other input of circuit 212 is taken from the output of address register 211, thus permitting addresses in address register 211 to be incremented and otherwise arithmetically modified to proceed through the proper sequence of program code word locations in memory 210.

A plurality of scratch pad registers 214 are also provided to store intermediate results of calculations. Scratch pad registers 214 are accessed by scratch pad address registers 215, loaded from bus 213.

An arithmetic and logic unit 216, having both its input and its output connected to bus 213, is used for all arithmetic and logic operations performed by the microprocessor. A second input to arithmetic and logic unit 216 is supplied from an accumulator register 217 also connected to bus 213.

Program instructions accessed from read-only memory 210 are delivered by means of bus 213 to an instruction register 218, the output of which is supplied to control logic 219 to control the operation of all of the other circuits in the microprocessor. A plurality of ports 220, 221, 222 and 223 are connected to bus 213 and provide independent outputs on leads 224, 225, 226 and 227, respectively. Port 222 additionally provides a STROBE signal on lead 228 when new data has been loaded into port 222 and is ready for output. Further details of the MK3870 microprocessor and the instruction set which is utilized in this microprocessor can be found in the publication "Mostek F8 Microprocessor Devices," dated July, 1977, and available from the Mostek Corporation.

The various ports of the microprocessor of FIG. 7 are used to receive and deliver the various control signals shown in FIG. 5. In general, port 220 provides the SELECT outputs on leads 135 (FIG. 6) as well as busy and alarm signals. Since port 220 is reserved for these output signals, they can be supplied at any time or continuously during the test sequence.

Port 221 provides the SLEEVE signals on leads 51 (FIG. 5) as well as the busy signals on leads 152 and, likewise, is available at all times to receive these signals. Port 223 provides tester address signals and clock signals to control the various inputs and outputs to port 222.

Port 222 provides a bidirectional data bus which, under the control of read/write and address signals from port 223, receives the tone detector outputs on leads 153 (FIG. 5) and the test result signals on leads 159, and generates the PROCEED signals on leads 47, the LOCK signals on leads 60, the display signals to display 132 and the test control signals on leads 151. The specific identification of the various signals at the ports of the microprocessor of FIG. 7 are listed in the following Tables I through VIII.

TABLE I

| Port 0 (Outputs) | | |
|---|---|---|
| P0-0 | SELA | Tester A Select |
| P0-1 | SELB | Tester B Select |
| P0-2 | SELC | Tester C Select |
| P0-3 | SELD | Tester D Select |
| P0-4 | ALLBUSY | All Testers Busy |
| P0-5 | TESTALM | Test Alarm |
| P0-6 | | (Not Used) |
| P0-7 | 120IPM | Fast Busy |

TABLE II

| Port 1 (Inputs) | | |
|---|---|---|
| P1-0 | SLVA | Trunk A Ready |
| P1-1 | SLVB | Trunk B Ready |
| P1-2 | SLVC | Trunk C Ready |
| P1-3 | SLVD | Trunk D Ready |
| P1-4 | ABUSY | Tester A Busy |
| P1-5 | BBUSY | Tester B Busy |
| P1-6 | CBUSY | Tester C Busy |
| P1-7 | DBUSY | Tester D Busy |

TABLE III

| Port 4 (Control Address/Read) | | |
|---|---|---|
| P4-0 | | (Not Used) |
| P4-1 | | (Not Used) |
| P4-2 | | (Not Used) |
| P4-3 | | (Not Used) |
| P4-4 | TONE DET | Tone Detected |
| P4-5 | MAJALM | Major Alarm |
| P4-6 | SZEBSY | Seize Busy |
| P4-7 | SEIZE | Channel Seized |

TABLE IV

| Port 4 (Control Address/Write) | | |
|---|---|---|
| P4-0 | PROCA | Proceed A Tester |
| P4-1 | PROCB | Proceed B Tester |
| P4-2 | PROCC | Proceed C Tester |
| P4-3 | PROCD | Proceed D Tester |
| P4-4 | LOCKA | Lock A Tester |
| P4-5 | LOCKB | Lock B Tester |
| P4-6 | LOCKC | Lock C Tester |
| P4-7 | LOCKD | Lock D Tester |

TABLE V

| Port 4 (Tester Address/Read) | | |
|---|---|---|
| P4-0 | LC | Line Current |
| P4-1 | LH | Test Level High |
| P4-2 | LL | Test Level Low |
| P4-3 | | (Not Used) |
| P4-4 | | (Not Used) |
| P4-5 | TV | Tip Voltage |
| P4-6 | SH | Sleeve High (Disconnect) |
| P4-7 | SL | Sleeve Low (Hold) |

TABLE VI

| Port 4 (Tester Address/Write) | | |
|---|---|---|
| P4-0 | OPERATE | K5 Relay (Polarity) |
| P4-1 | OPERATE | K6 Relay (Ring) |
| P4-2 | OPERATE | K7 Relay (Coin) |

TABLE VI-continued

| Port 4 (Tester Address/Write) | | |
| --- | --- | --- |
| P4-3 | OPERATE | K8 Relay (Reverse) |
| P4-4 | OPERATE | K9 Relay (Off-Hook) |
| P4-5 | OPERATE | K10 Relay (Test Tone) |
| $\overline{P4\text{-}5}$ | OPERATE | K11 Relay (Noise Cain) |
| P4-6 | OPERATE | K12 Relay (Self-Test) |
| P4-7 | OPERATE | K13 Relay (Cut-Through) |

TABLE VII

| Port 4 (Display Address/Write) | | |
| --- | --- | --- |
| P4-0 | DB0 | Display Bit 0 |
| P4-1 | DB1 | Display Bit 1 |
| P4-2 | DB2 | Display Bit 2 |
| P4-3 | DB3 | Display Bit 3 |
| P4-4 | DB4 | Display Bit 4 |
| P4-5 | DB5 | Display Bit 5 |
| P4-6 | DB6 | Display Bit 6 |
| P4-7 | DB7 | Display Bit 7 |

TABLE VIII

| Port 5 (Timing Outputs) | | |
| --- | --- | --- |
| P5-0 | CONTA | Control Address A |
| P5-1 | ADRA | Address A Tester |
| P5-2 | ADRB | Address B Tester |
| P5-3 | ADRC | Address C Tester |
| P5-4 | ADRD | Address D Tester |
| P5-5 | CLK2 | Address Display |
| P5-6 | CLK3 | Failure Time-Out Strobe |
| P5-7 | R/W | Read/Write |

Figure 8:
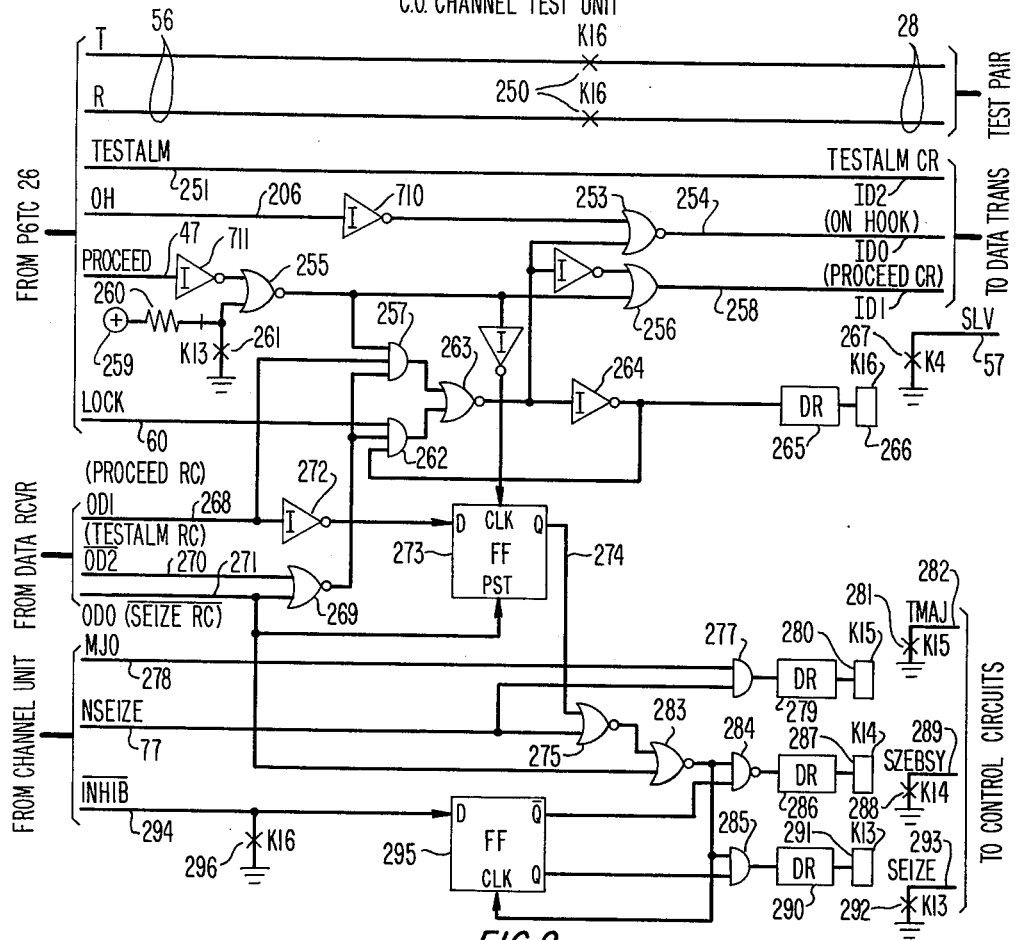
FIG. 8 is a detailed logic diagram of a central office channel test unit useful in the pair gain testing system of FIG. 1.

In FIG. 8 there is shown a detailed logic diagram of the central office channel test unit shown as block 27 in FIG. 1. The test unit of FIG. 8 includes the test pair 56 from the pair gain test controller 26 of FIG. 1 and extending via the test pair 28 to the remote location. The test pair is interrupted by normally open K16 contacts 250 which serve to complete a connection through the channel test unit from the pair gain test controller to the test pair extending to the remote location. In addition, a test alarm signal on lead 251, which is derived from the microprocessor of FIG. 8, is delivered to a data transmitter which will be described in connection with FIG. 14. This test alarm signal indicates that some testing sequence has failed or has timed out and is transmitted to the remote terminal to allow the test connections to be taken down at the remote terminal when such a failure occurs.

As previously noted, the tester unit of FIG. 6 is capable of generating an on-hook signal during the course of any testing sequence. This on-hook signal, appearing on lead 206, is supplied through inverter 710 to NOR gate 253, the output of which appears on lead 254, which is applied to the data transmitter of FIG. 14. The PROCEED signal on lead 47 is also generated in the pair gain test controller 26 and, in particular, in the microprocessor of FIG. 7. As shown in Table IV, this signal is generated once a tester unit has been selected and pretested for operability. The signal on lead 47 is supplied through inverter 711 to NOR gate 255, the output of which is supplied to OR gate 256 and AND gate 257. The output of OR gate 256 on lead 258 constitutes the PROCEED CR signal shown in FIG. 2 and is likewise applied to the data transmitter of FIG. 14. The remaining input to NOR gate 255 is taken from positive voltage source 259 through resistor 260. Under the influence of K13 contacts 261 (K13 relay 291 generates the SEIZE signal), this input to NOR gate 255 is high, thereby inhibiting the generation of the PROCEED CR signal, until a SEIZE signal is transmitted to the pair gain test controller 26. The LOCK signal on lead 60 is also generated in the microprocessor of FIG. 7 and is shown in Table IV.

Once a tester has been selected and the entire handshaking procedure has been completed, it is time to proceed with the testing sequence. The LOCk signal on lead 60 is applied at this time to AND gate 262. The output of AND gate 257 and the output of AND gate 262 are combined in NOR gate 263, the output of which is inverted in inverter 264 and applied to relay driver circuit 265. The output of driver 265 operates K16 relay 266 which, when operated, closes K16 contacts 267 and thus provides a ground on SLV lead 57. As discussed in connection with FIG. 2, this signal on lead 57 is used to operate the cut-apart relay contacts 58 in the pair gain test controller 26 to complete the test connections. This logic allows the operation of K16 relay 266 with the PROCEED signal on lead 47 and the PROCEED RC signal on lead 268. Once K16 relay 266 is operated, the LOCK signal on lead 60 will hold relay 266 operated when the PROCEED signal on lead 47 is terminated.

It can be seen that AND gate 257 corresponds to AND gate 48 in FIG. 2 while AND gate 262 corresponds to AND gate 61 in FIG. 2. One of the remaining inputs to AND gate 257 is taken from the PROCEED RC lead 268 from the data receiver to be discussed in connection with FIG. 15. The last input to AND gate 257 is taken from the output of NOR gate 269, the input of which appears on TESTALM RC lead 270 and SEIZE RC lead 271, both taken from the data receiver of FIG. 15. If the SEIZE RC signal on lead 271 disappears or if there is an alarm at the remote terminal (TESTALM RC), all of the relays in FIG. 8 are released by this logic. It can be seen that the SLV signal on lead 57 will therefore not be generated unless a PROCEED RC signal has already been received on lead 268 and a SEIZE RC signal has already been received on lead 271. It is also necessary that no TESTALM RC signal indicating an alarm signal at the remote terminal has been received on lead 270.

The remaining inputs to AND gate 262 comprise the output of inverter circuit 264 indicating that the SLV signal has been generated on lead 57, and the output of NOR gate 269, indicating that the SEIZE RC signal has been received on lead 271 and the TESTALM RC signal has not been received on lead 270. The inverted output of NOR gate 263 comprises the second input to NOR gate 253 and to NOR gate 256. The purpose of this circuitry is to identify the particular on-hook signal (which may be multipled) which is to be transmitted to the remote terminal. The output of NOR gate 263 can now produce the PROCEED CR signal on lead 258 and the PROCEED signal on lead 47 can be terminated.

The PROCEED RC signal on lead 268 is inverted in inverter 272 and applied to the D input of flip-flop 273. A clock signal is supplied to flip-flop 273 from the inverted output of NOR gate 255. On the falling edge of the PROCEED signal on lead 47, flip-flop 273 generates an output on lead 274 which is applied to NOR gate 275. In essence, flip-flop 273 serves to store an indication that the PROCEED RC signal was received on lead 268 at the appropriate point in the sequence and stores this information for future use. Flip-flop 273 is reset when the SEIZE RC signal is removed from lead 271. This permits termination of the SEIZE signal to the central office terminal.

The NSEIZE signal is received on lead 77 as discussed in connection with FIG. 3. The signal on lead 77 is applied to AND gate 277, the other input of which is a MJO signal on lead 278 which indicates that a major alarm condition has been received from the carrier system. The output of AND gate 277 is supplied to relay driver circuit 279, the output of which operates K15 relay 280. When operated, K15 relay 280 closes K15 contacts 281 to supply a TMAJ signal on lead 282. This alarm signal is used to signal a major alarm in the carrier system under test and is used to terminate the test sequence and signal the RSB with a slow busy signal.

The NSEIZE signal on lead 77 and the output of flip-flop 273 are combined in NOR gate 275, the output of which is applied to NOR gate 283. The remaining input to NOR gate 283 is taken from the SEIZE $\overline{RC}$ signal on lead 271. The output of NOR gate 283 clocks flip-flop 295 and serves as a logic signal to operate either K13 relay 291 or K14 relay 287, depending on the signal at the D input of flip-flop 295. If an $\overline{INHIB}$ signal appears on lead 294 (indicating that the metallic pair is already in use for another test), K14 relay 287 operates to generate a SZEBSY (seize busy) signal on lead 281. As noted in connection with FIG. 2, this SZEBSY signal is used to indicate that the facilities are busy. If the $\overline{INHIB}$ signal is not present on lead 294, K13 relay 291 operates to send the SEIZE signal (lead 273) to the pair gain test controller 26 (FIG. 2). K16 contacts 296 activate INHIB lead 294 when a test is in progress. ONce the PROCEED signal on lead 47 (from the pair gain test controller 26) is removed, flip-flop 273 is clocked and, via NOR gates 275 and 283, releases K13 relay 291.

Figure 9:
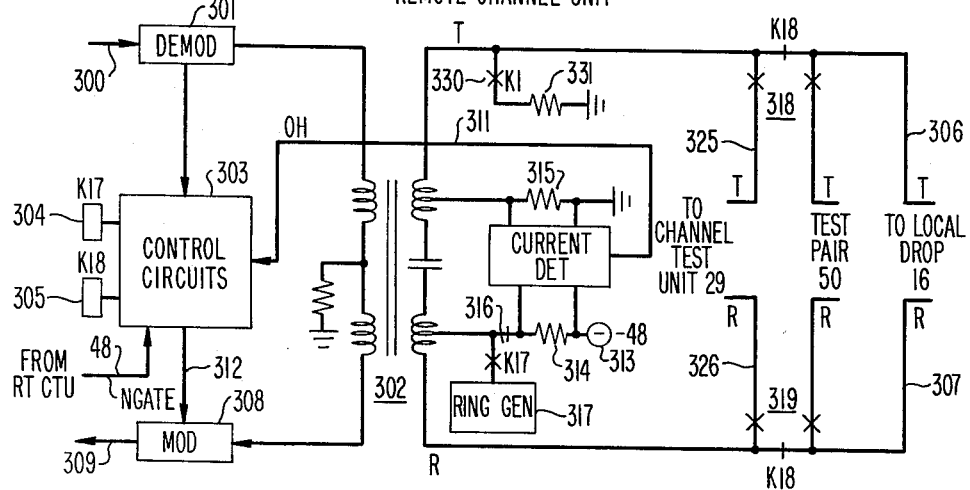
FIG. 9 is a detailed block diagram of a remote terminal channel unit useful in the pair gain testing system of FIG. 1.

In FIG. 9 there is shown a general block diagram of a remote channel unit as might be found in codec 44 of remote terminal 15 of the pair gain system. An input line 300 from the demultiplexor is supplied to a demodulator circuit 301 where the digital signals are translated into voice frequency signals and applied to hybrid transformer 302. Control signals from the digital pulse train are supplied to control circuits 303. Thus, for example, control signals which indicate that ringing is to be applied to the local telephone drop line are used to operate K17 relay 304. The NGATE signal described in connection with FIG. 2 appears on lead 48 and is supplied to control circuits 303. This signal causes K18 relay 305 to operate to set up the test connections.

Voice signals transmitted through hybrid transformer 302 appear on tip lead 306 and ring lead 307 which, in turn, are connected by the local drop line to the subscriber station circuit. Voice frequency signals received from the subscriber station on leads 306 and 307 are transmitted through hybrid transformer 302 to modulator circuit 308. In modulator circuit 308 these voice frequency signals are translated into pulse amplitude modulated signals on lead 309 which are supplied to a coder/multiplexor circuit for transmission on ingoing transmission line 14 of FIG. 1.

When the local subscriber goes off-hook, the loop current drawn through the telephone station set is detected by current detector 310 to provide an off-hook signal on lead 311 to control circuits 303. This off-hook signal is used on lead 312 to cause modulator 308 to encode an off-hook signal on the digital pulse stream transmitted on lead 309. This off-hook signal will be used at the central office terminal to provide a request for service during normal telephone use.

Normal talking battery is provided from negative voltage source 313 through resistor 314, a portion of one winding of hybrid transformer 302 and ring lead 307 to the subscriber station. A return path for this talking current is provided by way of tip lead 306, a portion of another winding of hybrid transformer 302 and resistor 315 to ground potential. K17 contacts 316 disconnect the normal talking battery and connect ring lead 307 to a ringing signal generator 317. K17 contacts 316 are operated by K17 relay 304 which, in turn, and as described above, is operated in response to the presence of a ringing code in the pulse train on lead 300. K17 relay 304 also operates K17 contacts 330 to provide a return path for ringing signals through resistor 331. K18 cut-apart relay 305, operated in response to a signal on lead 48 (and the presence of the test code on that channel), operates K18 contacts 318 and 319. The K18 cut-apart relay 305 is locked up by the NGATE signal until the test sequence is terminated. As can be seen in FIG. 9, contacts 318 and 319 serve to connect the local drop wires 306 and 307 to the test pair 50 of FIG. 2. Simultaneously, these contacts connect hybrid transformer 302 to the remote terminal channel test unit 29. In this way, the voice frequency metallic circuit is extended from the central office to the local drop wires and, at the same time, the channel itself is terminated in the channel test unit 29.

In FIG. 10 there is shown a general block diagram of a remote terminal channel test unit shown as block 29 in FIGS. 1 and 2. The channel test unit of FIG. 10 comprises a pair of conductors 325 and 326 which originate, as previously described, in the remote channel unit of FIG. 9. Leads 325 and 326 are connected through the normally closed portions of K19 contacts 327 and 328 to termination circuits 62. As previously noted, during the testing of each channel, the remote end of the channel unit is selectively terminated by passive terminations to aid the testing sequence. Moreover, these passive terminations are under the control of signals which would normally be used to control multiparty ringing or coin signaling when the subscriber loop is not under test. Thus, ringing signal detector 329 serves to detect the presence of ringing signals or coin control signals on leads 325 and 326 generated at the remote terminal in response to control signals transmitted from the central office. When K19 relay 331 is operated by the on-hook signal (as will be described in connection with FIG. 11), the outputs of detector 329 are supplied to ringing signal logic circuits 330 which utilize these ringing signals to control the operation of relays 331, 332 and 333.

Leads 325 and 326 are connected through the normally closed portion of K19 contacts 327 and 328 to terminating circuits 62, shown in general block form in FIG. 2. A line feed sense circuit 51 is connected across leads 325 and 326 to detect the presence of the talking battery supplied from the remote channel unit of FIG. 9. Termination circuit 62 is under the control of relays 331, 332 and 333. In particular, K20 contacts 334 are operated by K20 relay 332 to provide a short-circuit reflective termination for leads 325 and 326 when operated. In the absence of such a short-circuit termination, resistors 335 and 336 provide a matched dissipative termination for leads 325 and 326. The common junction between resistors 335 and 336 is connected through the K20 transfer contacts 340 of K20 relay 332 to diodes 337 and 338 which, in turn, are connected through resistor 339 and normally closed K21 contacts 341 to ground potential. Thus, a balanced ground of either polarity can be supplied by means of K20 contacts 340 operated by K20 relay 332. K21 relay 333 opens normally closed contacts 341 to terminate the balanced connection. This connection is used to simulate automatic number identification ground or coin ground at remote subscriber stations.

It will be noted that, in order to carry out complete testing of a subscriber loop in the pair gain system, the only equipment required at the remote terminal is the set of artificial terminations 62 and the control circuitry necessary to select these terminations. All of the complicated equipment for generating signals and evaulating responses is located at the central office. Moreover, this central office circuitry need not be duplicated for the various different subscriber channels or pair gain systems and thus is used in common for testing a large number of subscriber channels.

Also shown in FIG. 10 are control circuits 350 which are used to control the other portions of the channel test unit. In particular, the NSEIZE signal on lead 45 is supplied to control circuits 350, which, in turn, supply the NGATE signal on lead 48. The output of the line feed sense circuit 51 is also supplied to control circuits 350 as are various alarm signals and other test signals on leads 351. Control circuits 350 also operate K22 relay 352 to close K22 contacts 715 to connect the metallic pair 28 to leads 50 (FIG. 2).

A data encoder 353 and a data decoder 354 are also shown in FIG. 10. These circuits receive signals from control circuits 350 and deliver signals to control circuits 350. Data encoder 353 provides serial digital signals on data lead 355 for transmission to the central office via the data link. Central office serial data signals on lead 356 are decoded in decoder 354 and supplied to control circuits 350. Encoder 353 and decoder 354 will be discussed in more detail in connection with FIGS. 14 and 15, respectively.

In FIG. 11 there is shown a detailed logic diagram of the ringing signal logic circuit 330 of FIG. 11. The logic circuit of FIG. 11 comprises four input leads 400, 401, 402 and 403. Signals on these leads indicate the detection of positive superimposed ringing and coin voltages on the tip conductor (lead 400), negative superimposed ringing and coin voltages on the tip conductor (lead 401), positive superimposed ringing and coin voltages on the ring conductor (lead 402) and negative superimposed ringing and coin voltages on the ring conductor (lead 403). A signal on lead 400 is applied to NAND gate 404, the output of which is supplied through NOR gate 405 to the set input lead of off-hook flip-flop 406. The ZERO output of flip-flop 406 is applied through relay driver 407 to operate K19 relay 331. The output of NOR gate 405 is also applied to NAND gate 408, the other input of which is derived from on-hook lead 409. The output of gate 408 is used to reset flip-flop 406, thereby operating relay driver 407 and K19 relay 331. K19 relay 331 connects tip conductor 325 and ring conductor 326 to ringing detectors 329 (FIG. 10). When ringing is detected, logic circuit 330 causes K19 relay 331 to release, thus transferring conductors 325 and 326 to terminations 62. A new on-hook command on lead 409 causes K19 relay 331 to operate, again connecting conductors 325 and 326 to the ringing detectors 330.

Signals on lead 401 are applied to the $\overline{\text{set}}$ input of flip-flop 411. The Q output of flip-flop 411 is applied through relay driver 412 to operate K20 relay 332.

Signals on lead 402 are supplied to the $\overline{\text{set}}$ input of flip-flop 414, the Q output of which is applied through relay driver 415 to operate K21 relay 333. Flip-flops 411 and 414 are reset (and hence the respective relays released) in response to an output from NOR gate 416. One input to NOR gate 416 is the on-hook signal on lead 409. The other input is an inverted PROCEED CR signal on lead 417. Lead 417 also comprises the remaining input to NOR gate 405. This insures that, at the beginning of each new test, all relays are released so as to be ready for new ringing signals.

Signals on lead 403 are applied to the $\overline{\text{set}}$ input of flip-flop 418, the Q output of which is supplied as another input to the set terminals of flip-flops 411 and 414. Flip-flop 418 is reset by the output of NOR gate 416. The Q outputs of flip-flops 411 and 414 are applied as the remaining inputs to NAND gate 404.

It can be seen that a signal on lead 400 or the resetting of flip-flop 411 or 414 result in an output from gate 404 which is applied via NOR gate 405 to set flip-flop 406. Thus, K20 relay 332 operates on −T (lead 401) or −R (lead 403) ringing signals and K21 relay 333 operates on −R (lead 407) or +R (lead 402) ringing signals. Both relays 332 and 333 are released by the on-hook command on lead 409. These relay operations are arranged to accommodate particular test sequences initiated at the central office terminal and which will be described hereinafter.

Figure 12:
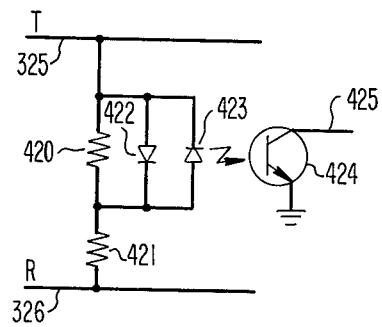
FIG. 12 is a detailed circuit diagram of a line feed sensing circuit used in the remote terminal channel test unit of FIG. 10.

In FIG. 12 there is shown a detailed circuit diagram of a line feed sense circuit 51 of FIG. 10. This circuit comprises a pair of resistors 420 and 421 connected in series between tip lead 325 and ring lead 326 (see FIG. 10). A pair of light-emitting diodes 422 and 423 is connected across resistor 420 and poled oppositely to each other. Thus, a signal of either polarity across conductors 325 and 326 will cause a current to flow through either diode 422 or 423. When such a current flows through one of these diodes, the diode emits visible light which is detected by light-detecting transistor 424 to provide an output signal on lead 425. As indicated in connection with FIG. 10, the signal on lead 425 is supplied to control circuits 350 to indicate the presence of talking battery on conductors 325 and 326. This signal is used to confirm the completion of the cut-apart procedure described in connection with FIG. 2 and, thus, to insure that the test sequence does not continue unless this initial cut-apart operation has been successfully completed. The current detector of FIG. 12 is also used to detect a stuck cut-apart relay and give an alarm signal.

Figure 13:
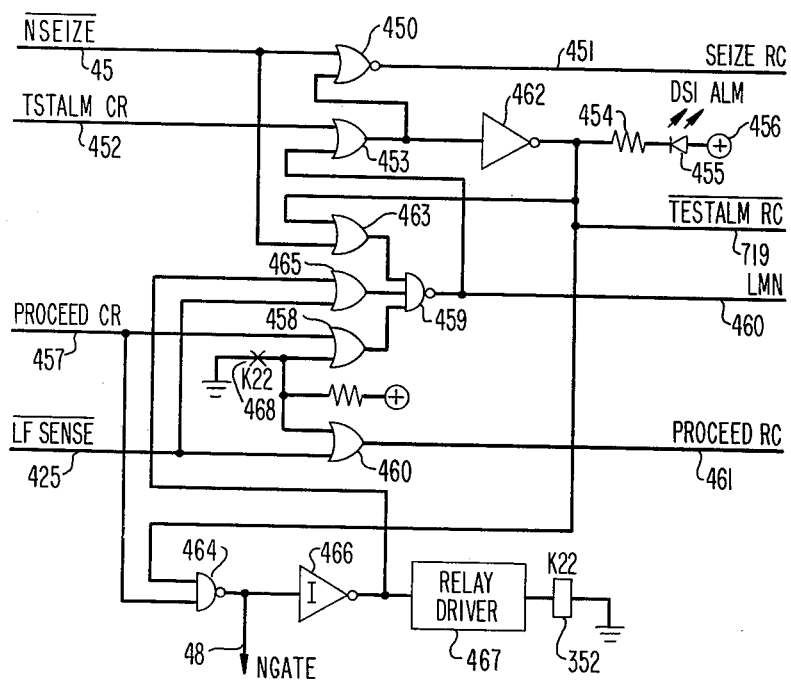
FIG. 13 is a detailed logic diagram of the control circuits in the remote terminal channel test unit of FIG. 10.

In FIG. 13 there is shown a detailed logic diagram of the control circuits 350 of FIG. 10. In general, these control circuits operate as an interface between the data encoder 353, the data decoder 354 and the balance of the circuits. Thus, an NSEIZE signal on lead 45 is supplied to NOR gate 450, the output of which appears on lead 451 as the SEIZE RC signal to be transmitted back to the central office location to indicate that the appropriate channel at the remote terminal has been identified. A TESTALM CR signal on lead 52 from the central office location indicates that an alarm condition has been reached during the progress of a handshaking sequence. This signal is applied to OR gate 453, the output of which is supplied through inverter 462, resistor 454 and light-emitting diode 455 to positive voltage source 456. Thus, when an alarm condition occurs at the central office, this signal serves to light an indicating lamp at the remote terminal to signify the alarm condition. Simultaneously, the test sequence is terminated and a fast-busy is sent back to the RSB.

A PROCEED CR signal on lead 457 is supplied to NAND gate 464, the output of which comprises the NGATE signal on lead 48, indicated in FIG. 10. The other input to NAND gate 464 is the $\overline{\text{TESTLAM RC}}$ signal on lead 719, which inhibits the NGATE signal during alarm conditions. OR gates 463, 465 and 458 and NAND gate 459 form a local minor alarm (LMN) logic. Gate 458 forces a minor alarm signal on lead 460 if the PROCEED CR signal on lead 457 is low and the K22 cut-through relay 352 is operated. Gate 465 forces an alarm on lead 460 if the NGATE signal on lead 48 is high (inactive) and line feed current is sensed on lead 425. Gate 463 forces a low on lead 460 if an alarm condition exists ($\overline{\text{TESTALM RC}}$) and the NSEIZE signal on lead 45 is low (inactive). A low signal at any of the three OR gate outputs (463, 465 and 458) forces the NAND gate 459 output to the active state. This LMN local minor alarm signal is also supplied as the remaining input to OR gate 453 to light the alarm lamp 455. The output of the line feed sense circuit 51, shown in detail in FIG. 12, appears on lead 425. This signal is supplied through OR gate 460 to output lead 461 which comprises the PROCEED RC signal to be transmitted back to the central office location.

The output of NAND gate 464 comprises the NGATE signal on lead 48 and, when inverted in inverter 466, is applied to the remaining input of OR gate 465. The output of inverter 466 is also supplied through the relay driver 467 to operate K22 relay 352. When operated, K22 relay 352 operates K22 contacts 468 to remove one input from OR gate 458 and one input from OR gate 460, thus acting as a monitor for a stuck K22 relay 352 if no test is in progress.

Figure 14:
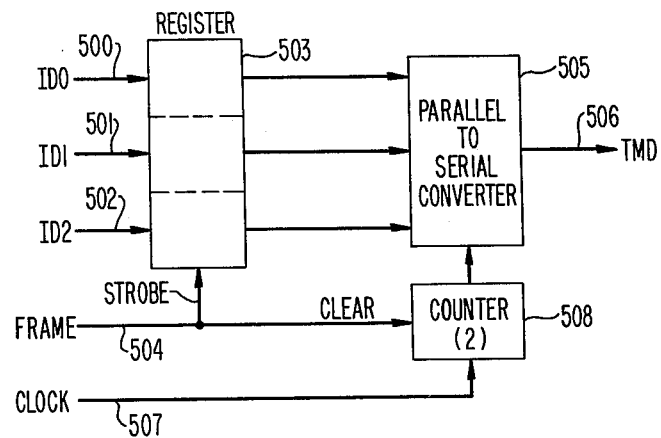
FIG. 14 is a detailed block diagram of a data transmitter useful in both the central office channel test unit of FIG. 8 and the remote terminal channel test unit of FIG. 10.

In FIG. 14 there is shown a detailed block diagram of the data transmitter or encoder 353 shown in FIG. 10. It is to be understood that a data transmitter such as that shown in FIG. 14 is located at each terminal of the system of FIG. 1 and communicates with a data receiver such as that shown in FIG. 15 at the other terminal via the data link. It is this data transmitter and data receiver which are used to exhange the handshaking signals which permit the test connections to be set as described in connection with FIG. 2.

Returning to FG. 14, three input signaling conditions are indicated by signals on lead 500, 501 and 502. These signaling conditions are set in the three bit positions of register 503 by a strobe signal on lead 504. The contents of register 503 are supplied to a parallel-to-serial converter 505. Converter 505 converts these parallel bits into a serial bit stream on lead 506 which can then be applied to the multiplexor circuit of the pair gain system for transmission to the other terminal. Clock signals on lead 507 are supplied to a counter circuit 508 which controls the parallel-to-serial converter 505. The framing signal on lead 504 not only strobes new input data to register 503 but also clears counter 508 for the generation of the next serial bit train and disables counter 508 until the appropriate time slots in the serial bit stream.

Figure 15:
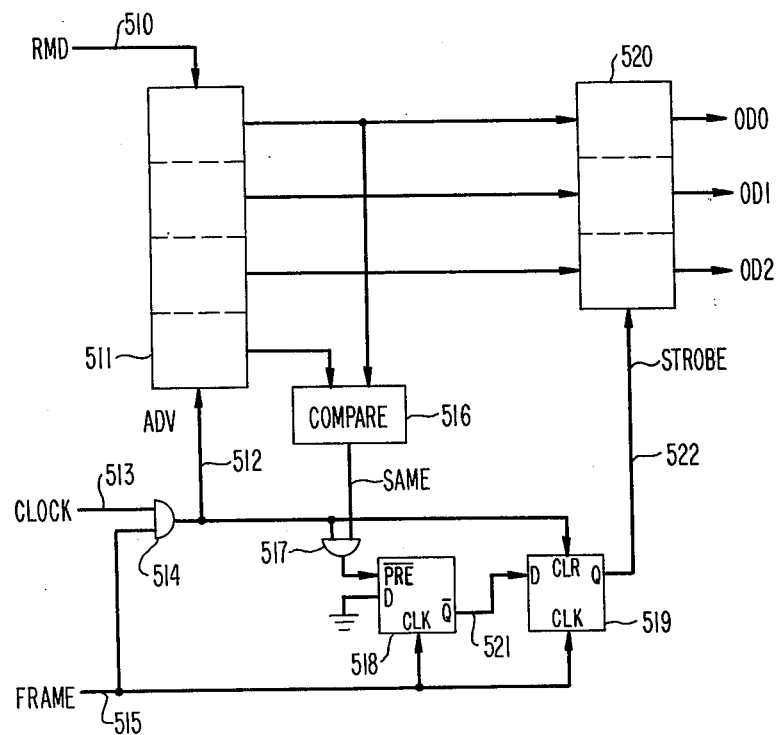
FIG. 15 is a detailed block diagram of a data receiver useful in both the central office channel test unit of FIG. 8 and the remote terminal channel test unit of FIG. 10.

In FIG. 15 there is shown a data receiver which receives the data generated by a transmitter of FIG. 14. Thus, serial data arriving on lead 510 is clocked into a shift register 511 under the control of clock signals on lead 512. These clock signals are generated from a clock stream on lead 513 gated in AND gate 514 by a framing signal on lead 515. It will be noted that shift register 511 has four bit storage positions. The extra storage position permits the serial pulses received on lead 510 to be stored until they have been received twice in succession and compared and the retransmission is found to be identical to the original.

Thus, the last stage of shift register 511 is applied to a compare circuit 516 together with the output of the first stage of shift register 511. If these signals are the same, an output signal partially enables AND gate 517. The output of AND gate 517, in turn, is applied to the $\overline{\text{preset}}$ input of flip-flop 518. The remaining input to AND gate 517 is a stream of clock pulses taken from the output of AND gate 514. Thus, the $\overline{\text{preset}}$ input to flip-flop 518 is active each time the signals in the first and second transmission are the same.

The ZERO output of flip-flop 518 is applied to the D input of flip-flop 519. The ONE output of flip-flop 519 is applied as a strobe signal to register 520 to gate the contents of the first three bit positions of shift register 511 into register 520. Flip-flop 518 is clocked by framing signals on lead 515, while flip-flop 519 is clocked by the output of AND gate 514. Flip-flop 519 is cleared by the framing signal on lead 515.

It can be seen that flip-flop 518 will be held preset by the output of AND gate 517 so long as the output of compare circuit 516 indicates that the signals in corresponding successive bit positions are identical. The $\overline{\text{Q}}$ output of flip-flop 518 is held high because the D input is grounded. In this condition, the frame signal on lead 515 will strobe the contents of register 511 into register 520. If compare circuit 516 indicates a disparity, flip-flop 518 is preset, resetting flip-flop 519 and preventing the stroke signal from being generated on lead 522. After three identical receptions of data bits, flip-flop 518 will remain in the reset condition and no output will appear on lead 521. The clock signal from gate 514 will force flip-flop 519 to the ONE state to provide a strobe signal on lead 522 to read data into register 520. If the successive bits of the data word are not identical, flip-flop 518 will be preset and no strobe signal will be generated.

Figures 16, 17:
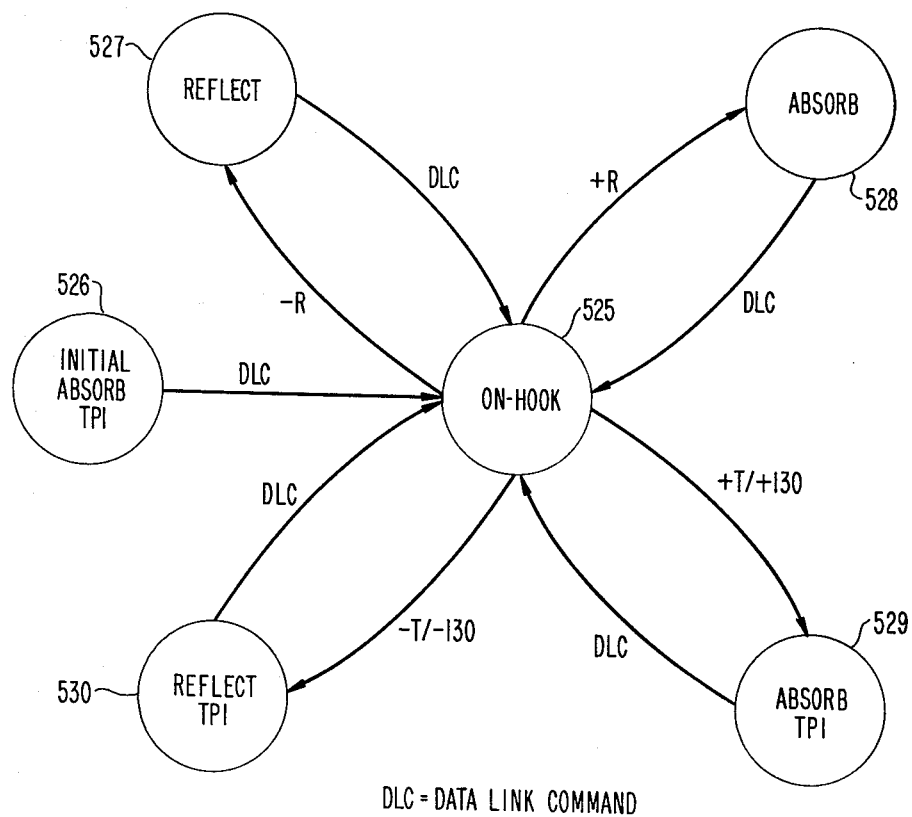
FIG. 16 is a table representing the various signaling states of the data transmitter of FIG. 14 and the data receiver of FIG. 15 for transmissions back and forth between the central office and remote terminals.
FIG. 17 is a state diagram of the sequence of remote terminal test termination configurations, shown in circuit form in FIG. 10.

In FIG. 16 there is shown a tabular identification of the various signals transmitted between the central office location and the remote terminal location using the data transmitter of FIG. 14 and the data receiver of FIG. 15. Thus, the three bits (identified as D0, D1 and D2) being transmitted to the central office location represent the SEIZE RC, PROCEED RC and TESTALM RC signals. In the opposite direction, from the central office to the remote terminal, D0 represents the OH signal, D1 represents the PROCEED CR signal and D2 represents the TESTALM CR signal.

In order to better understand the automatic test sequences carried out by the pair gain test controller 26 of FIG. 1, it is helpful to consider the test terminations 62 shown in detail in FIG. 10. In general, K19 contacts 327 and 328 are used to transfer the remote appearance of the channel between the termination circuit 62 and ringing signal detector 329. When K19 contacts 327 and 328 are operated, the remote terminal is said to be in the on-hook condition since the channel test unit of FIG. 10 is then able to respond to coded ringing signals by means of detector 329 and thereby control the terminations 62. In operation, the remote terminal starts with an absorptive termination (contacts 327 and 328 released), and each time it is desired to change the terminations 62, the remote terminal is returned to the on-hook condition (contacts 327 and 328 operated) preparatory to receiving new coded ringing signals to set up the new termination.

K20 contacts 334 provide a reflective termination when closed. When these contacts are opened, an absorptive termination is provided by resistors 335 and 336. Tip party identification is provided by K20 contacts 340 and K21 contacts 341. K20 contacts 340 control the polarity of the tip-to-ground identification current that is permitted to flow while K21 contacts 341 interrupt this current path. The sequencing of the various terminations is shown more clearly in the state diagram of FIG. 17.

Turning to FIG. 17, it can be seen that the initial state 526 of the termination circuits provides an absorptive termination with tip party identification. That is, K19 contacts 327 and 328 are released, K20 contacts 334 and 340 are released and K21 contacts 339 are released. In this condition, measurements can be taken on echo return loss and coin channel units identified. Once these measurements are completed, the circuit can be returned to the on-hook state 525 (operate K19 contacts 327 and 328 in FIG. 10) by means of the on-hook signal transmitted over the data link as indicated in FIG. 16. The circuits of FIG. 10 are then in a condition to receive coded ringing signals to rearrange the termination. Negative superimposed ringing on the ring conductor, for example, sets up a reflective termination without TPI (see state 527) which can be used to measure the round-trip return loss as well as the idle channel noise. Again, when these measurements have been completed, the remote terminal 15 is returned to the on-hook condition by a signal transmitted on the data link. Similarly, a positive superimposed ringing signal on the ring conductor will place the terminations 62 in the absorptive state without the tip party identification connection, as shown in state 528. Following measurements in this state, the terminations are again returned to the on-hook state 525 by the on-hook data command. Similarly, positive superimposed ringing on the tip conductor can be used to place terminations in the absorptive state 529 with tip party identification or, by using negative superimposed ringing on the tip conductor, in a reflective termination state 530 with tip party identification. A summary of these states and the signals necessary to get to these states, as well as the condition of the three relays 331, 332 and 333, are shown in Table IX.

TABLE IX

| State (FIG. 17) | Initiated By | X = Operated O = Released Relays | | |
|---|---|---|---|---|
| | | K19 | K20 | K21 |
| Initial Absorb TPI (526) | PROCEED CR | O | O | O |
| Absorb TPI (526) | +T Ringing or +130V | O | O | O |
| Reflect TPI (530) | −T Ringing or −130V | O | X | O |
| Absorb (528) | +R Ringing | O | O | X |
| Reflect (527) | −R Ringing | O | X | X |
| On-Hook (525) | OH DLC | X | O | O |

Figure 18:
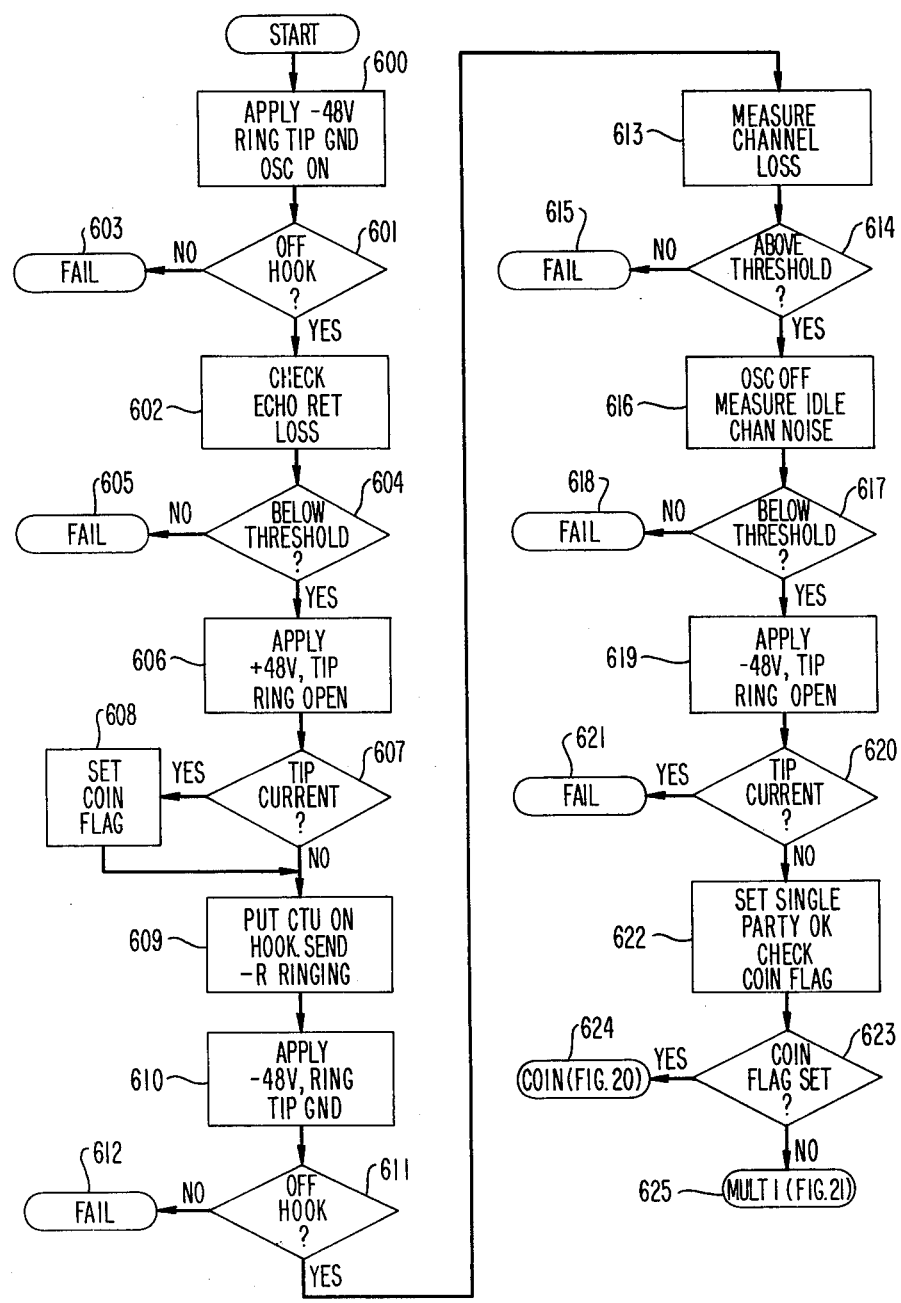
FIG. 18 is a flowchart of the test sequence provided by the microprocessor of FIG. 7 for testing single-party carrier channels in the system of FIG. 1.
Figure 19:
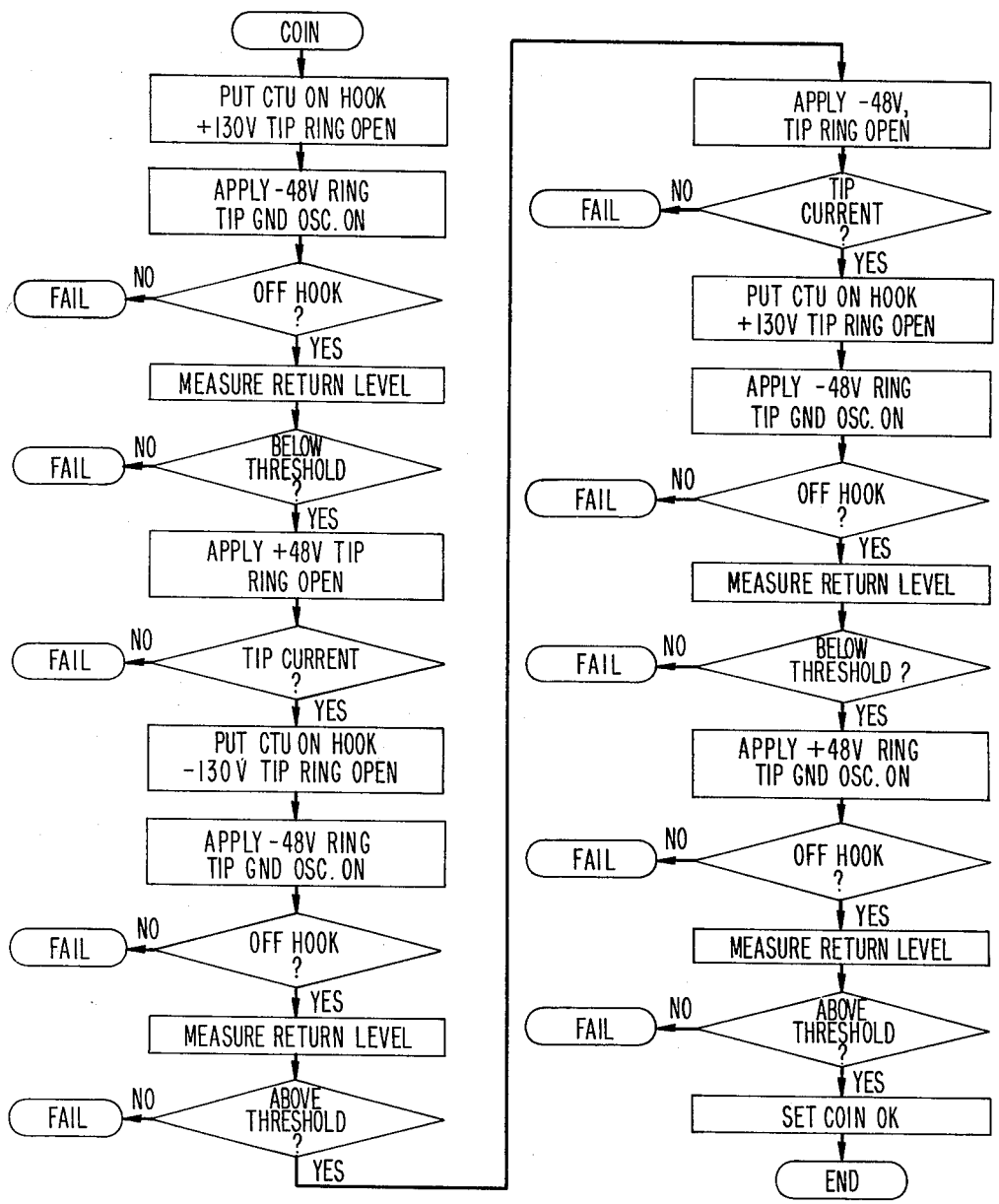
FIG. 19 is a flowchart of the testing sequence for a coin channel in the pair gain system of FIG. 1.
Figure 20:
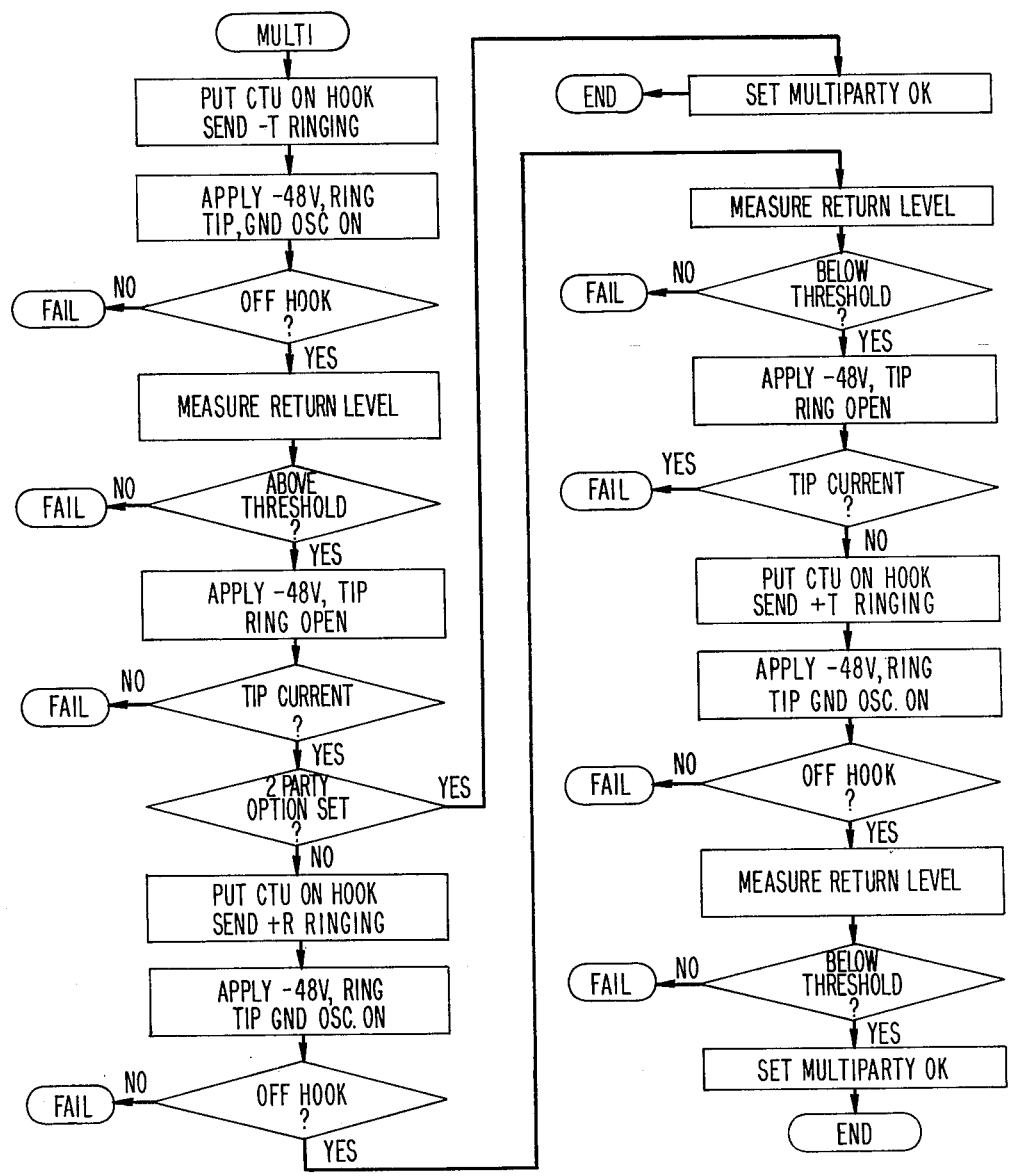
FIG. 20 is a flowchart of the test sequence for a multiparty channel in the pair gain system of FIG. 1.

In FIGS. 18, 19 and 20 there are shown detailed flowcharts of the various test sequences controlled by the microprocessor in the pair gain test controller 26 and utilizing the various terminations shown in FIG. 10. The test sequence flowchart of FIG. 18 will be described in detail since it is representative of the other test sequences. At the beginning of the test, the PROCEED CR signal places the termination in the initial absorptive condition, that is, as shown in Table IX, with K19 relay 331 released and K20 relay 332 and K21 relay 333 released. In this condition, the resistors 335 and 336 provide an absorptive termination while the K20 contacts 340 and K21 contacts 339 permit a positive coin identification current to flow. A central office tester unit 131 then places a standard −48 volt battery on the ring conductor while grounding the tip conductor. This is accomplished, as shown in FIG. 6, by K5 contacts 175 remaining released and K8 contacts 180 remaining released. This is the normal battery condition. At this time the test signal oscillator 163 is enabled by allowing K10 contacts 166 to remain open. This is accomplished in box 600 in FIG. 18. In decision box 601 the off-hook condition is tested to make sure that all of these connections have been set up. As shown in FIG. 9, a negative voltage is supplied to the ring conductor from source 313 via normally closed contacts 316. If this off-hook voltage is present, an off-hook current will flow through the absorptive resistors 335 and 336 (FIG. 10) and permit this line current to be detected by current detector 202 in tester unit 131 (FIG. 6). If no current is sensed, this represents a failure condition as shown in box 603.

If off-hook current has been detected, the test tone and the detectors 167, 168, 170 and 171 of FIG. 6 can measure the echo return loss as shown in box 602 in FIG. 18. If this echo return is below a threshold set by compare circuit 171, testing can continue. If it is above this threshold, however, a fail condition again exists as indicated by box 605.

If the channel passes this test, +48 volts are supplied to the tip conductor with the ring open, as shown in box 606. A positive voltage on the tip conductor will not cause tip current to flow in normal subscriber sets but will permit a tip current to flow in coin station sets. Thus, decision box 607 checks for this tip current and, if it is present, sets a flag in box 608 to indicate that the channel is a coin channel. If no tip current flows, it is assumed that the channel is a noncoin channel.

In box 609 the terminations are again put in on-hook condition (via a data link command), a burst of negative ringing on the ring conductor is sent and then −48 volts potential is placed on the ring conductor, with the tip grounded as shown in box 610. Again, in decision box 611 termination is tested to insure that it is in the on-hook condition and, if not, a failure indication is given in box 612. If the set is in the off-hook condition, it is now possible to measure channel loss. The negative superimposed ringing signal on the ring conductor sent in box 609 sets up the reflective termination state 527 of FIG. 17 by operating K20 contacts 334. Under this condition, the test tone is reflected from the short-circuit reflective termination, and thus the return signal is a measure of the round-trip channel loss. This measurement is made in box 613 and takes place in the same detecting circuits 167, 168, 170 and 171 of FIG. 6. If this channel loss is below the desired threshold, as measured in decision box 614, a failure state is entered in box 615. If it is above the threshold, the test signal oscillator 163 is turned off in FIG. 6 by operating K10 contacts 166 as shown in box 616 in FIG. 18.

It is now possible to measure the round-trip idle channel noise in decision box 617 to determine whether this idle channel noise is above or below a desired threshold. In order to measure the noise signal, K11 contacts 169 in FIG. 6 are closed to provide an additional 50 dB of gain in the measurement path. If the noise signal is above this threshold, failure state 618 is entered. But if it is below the threshold, these −48 volts are applied to the tip conductor with the ring open as shown in box 619. Under this condition, there should be no tip current. This is tested in decision box 620 and, if tip current is detected, a failure state 621 is entered. If no tip current is detected, the "single party okay" check flag is set in box 622. Thereafter, in decision box 623, the coin flag is checked to see if it is set. If the coin flag is set, the test proceeds to the coin sequence indicated by box 624 and illustrated in detail in FIG. 19. If the coin flag is not set, it is indicated by box 625. The multiparty test sequence of FIG. 20 is entered.

The test sequences of FIGS. 19 and 20 are quite similar to those discussed in connection with FIG. 18 and hence will not be described in detail. As in FIG. 18, these test sequences involve the application of coded ringing signals or ±130-volt coin voltages to set up appropriate terminations at the remote end of the channel and the application of coin or talking battery voltages to test particular aspects of the supervisory signaling system as transmitted through the carrier-derived subscriber channel. Alternating current measurements on the return loss, round-trip channel loss and idle noise are also made as described in connection with FIG. 18.

When all of the appropriate test sequences have been completed successfully, the subscriber channel is marked as okay and this okay condition is relayed back to the RSB by providing tone bursts or direct current voltage levels on the RSB trunk 25. Personnel at the RSB can request this test result indication at any time after completion of the tests. In the case where automatic testing equipment is used at the RSB, a particular voltage level is used to notify the automatic equipment that the tests have or have not been successfully completed.

It can be seen that the pair gain testing system described above can be used to simultaneously test both metallic drop wires to the subscriber station and also the carrier-derived subscriber channel through the pair gain system. This testing system is entirely independent of the type of pair system used since it relies on the application of standard telephone signals for controlling the test sequence. Thus, standard multiparty ringing signals or coin collect and return signals are used to control the remote terminations of the carrier-derived channel in order to carry out the necessary tests. A failure in a test sequence at any point during that testing sequence results in an indication being generated at the central office location to alert attendant personnel of the channel failure. The metallic pair which is used for testing purposes and which extends between the central office terminal and the remote terminals (pair 28 in FIG. 1) is shared by all of the subscribers at the remote location. Thus, only one subscriber in the pair gain system can be tested at any one time. Since the automatic channel testing can be completed in very few seconds (2 to 4 seconds), this imposes no great limitation on the testing procedure. Attendant personnel can reorder a test sequence at any time by reinitiating the request for a test.

It should also be noted that, by providing a plurality of tester units in the pair gain test unit 26 and simultaneously providing a plurality of test trunks connected to the pair gain test controller, a single RSB can simultaneously conduct tests on subscriber channels in different pair gain systems. This capability generally permits personnel at an RSB to conduct tests on any subscriber loop without concerning themselves about whether that subscriber is served by a metallic pair or through a pair gain system. This transparency of the testing system to the type of subscriber service provides an enormous administrative saving in the central office repair facility. It is not necessary for personnel to learn and administer separate testing procedures for the various types of subscriber service. Moreover, since the bulk of the tests are conducted automatically and rapidly, testing procedures can be carried out with great dispatch and thereby speed up the entire operation of the RSB.

We claim:

1. A pair gain subscriber loop testing system for testing subscriber loops implemented by a combination of carrier-derived channels in at least one pair gain subscriber loop transmission system and local drop wires from the remote terminal of said transmission system to subscriber stations, said testing system
CHARACTERIZED BY
drop testing means for extending a metallic path from a central office testing facility to the local drop of a tested subscriber, and
channel testing means for simultaneously testing the carrier-derived channel corresponding to said tested subscriber.

2. The testing system according to claim 1 further
CHARACTERIZED BY
a single metallic test pair extending between the local and remote terminals of said pair gain system, and
means for sharing said test pair between all of the subscriber loops derived by said pair gain system.

3. The testing system according to claim 1 further
CHARACTERIZED IN THAT
said channel testing means comprises
automatic test sequencing means at the local terminal of said pair gain system, and
means for selectively terminating said carrier-derived channel at the remote terminal of said pair gain system.

4. The testing system according to claim 1 further
CHARACTERIZED BY
a plurality of test trunks extending from said central office testing facility to a central office switching facility, and
means in said test trunks for cutting apart said test trunks to connect said test facility to said metallic path and to connect said switching facility to said channel testing means.

5. The testing system according to claim 3
CHARACTERIZED IN THAT
said automatic test sequencing means includes a stored program microprocessor.

6. The testing system according to claim 3
CHARACTERIZED IN THAT
said selective terminating means includes means responsive to telephone supervisory signals for altering the termination of said carrier-derived channel at said remote terminal.

7. The testing system according to claim 1 further
CHARACTERIZED BY
a data link included in said pair gain system, and
means including said data link for simultaneously enabling said drop testing means and said channel testing means.

8. The testing system according to claim 7 further
CHARACTERIZED BY
test voltage responsive means at the local terminal of each channel of said pair gain system and responsive to a test voltage from said testing facility to generate a tone, and tone detection means responsive to said tone for initiating said simultaneous enabling means.

9. A subscriber loop testing system for telephone central offices comprising a testing facility, means including a central office switching facility for establishing a connection between said testing facility and either a metallic subscriber loop or a carrier-derived subscriber loop, means for cutting apart said connection for carrier-derived subscriber loops only, and means for connecting said testing facility to a metallic pair paralleling said carrier-derived subscriber loop and simultaneously connecting said carrier-derived subscriber loop to automatic carrier channel testing apparatus.

10. The subscriber loop testing system according to claim 9 further comprising means for selectively connecting said metallic pair to a tested subscriber station, and means for selectively terminating said carrier-derived channel.

11. The subscriber loop testing system according to claim 10 wherein said selective terminating means comprises means for providing an absorptive termination, and means for providing a reflective termination.

12. The subscriber loop testing system according to claim 10 wherein said selective terminating means comprises means for providing a current path for tip party identification.

13. The subscriber loop testing system according to claim 9 wherein said automatic carrier channel testing apparatus comprises means for testing the alternating current characteristics of said carrier-derived subscriber loop, and means for testing the telephone signaling characteristics of said carrier-derived subscriber loop.

14. The subscriber loop testing system according to claim 13 wherein said alternating current testing means comprises means for testing echo return loss, means for testing transmission loss, and means for testing idle channel noise.

15. The subscriber loop testing system according to claim 13 wherein said telephone signaling testing means comprises means for testing single-party and multiparty ringing signaling, and means for testing coin channel supervision and signaling.

16. The subscriber loop testing system according to claim 9 further comprising means for selectively terminating said carrier-derived subscriber loop.

17. The subscriber loop testing system according to claim 9 wherein said automatic carrier channel testing apparatus comprises stored program data processing means.

18. The subscriber loop testing system according to claim 16 wherein said selective terminating means includes means responsive to superimposed ringing signals for altering the termination of said carrier channel.

19. the subscriber loop testing system according to claim 9 further comprising a data channel paralleling said pair gain system, and means including said data channel for enabling said cut-apart means.

20. The subscriber loop testing system according to claim 9 further comprising test voltage detecting means associated with said carrier-derived subscriber loop, and means including said test voltage detecting means for enabling said cut-apart means.

21. A method of testing a carrier-derived subscriber telephone loop comprising the steps of (a) separating the carrier portion and the metallic portion of said telephone loop, (b) connecting said metallic portion to metallic testing facilities by way of an auxiliary metallic path, (c) connecting said carrier portion to automatic carrier portion testing facilities, and (d) simultaneously testing said metallic portion and said carrier system with their respective testing facilities.

* * * * *

UNITED STATES PATENT AND TRADEMARK OFFICE
CERTIFICATE OF CORRECTION

PATENT NO. : 4,270,030

DATED : May 26, 1981

INVENTOR(S) : Stephen J. Brolin, Jeffrey L. Gottesman, Dennis H. Morgen, and Kenneth H. Swanson It is certified that error appears in the above—identified patent and that said Letters Patent is hereby corrected as shown below:

```
Column  1, line 34, "facilites" should read --facilities--.
Column  5, line 60, "apearance" should read --appearance--.
Column  5, line 62, "and" should read --on--.
Column  6, line 40, "wih" should read --with--.
Column  6, line 52, "single-part" should read --single-party--.
Column  7, line 24, "interconection" should read
 --interconnection--.
Column 11, line 13, "By of way" should read --By way of--.
In TABLE VI, Column 13, line 7, "OPERATE K11 Relay(Noise Cain)"
 should read --P4-5 OPERATE K11 Relay(Noise Gain)--.
Column 14, line  8, "LOCk" should read --LOCK--.
Column 15, line 19, "SEIZE RC" should read --SEIZE RC--.
Column 15, line 33, "ONce" should read --Once--.
Column 17, lines 14 & 15, "evaulating" should read
 --evaluating--.
Column 18, line 16, "Q" should read --Q--.
Column 19, line  6, "TESTLAM RC" should read --TESTALM RC--.
Column 19, line 46, "FG. 14," should read --FIG. 14,--.
```

Signed and Sealed this

Fourth Day of May 1982

[SEAL]

Attest:

GERALD J. MOSSINGHOFF

Attesting Officer    Commissioner of Patents and Trademarks